US012267623B2

United States Patent
Binder et al.

(10) Patent No.: US 12,267,623 B2
(45) Date of Patent: Apr. 1, 2025

(54) CAMERA-LESS REPRESENTATION OF USERS DURING COMMUNICATION SESSIONS

(71) Applicant: Apple Inc., Cupertino, CA (US)

(72) Inventors: Justin G. Binder, Oakland, CA (US); Abhimanyu Yadav, San Francisco, CA (US); Ahmed S. Hussen Abdelaziz, Cupertino, CA (US); Abhishek Walia, Santa Clara, CA (US); Anushree Prasanna Kumar, San Jose, CA (US)

(73) Assignee: Apple Inc., Cupertino, CA (US)

( * ) Notice: Subject to any disclaimer, the term of this patent is extended or adjusted under 35 U.S.C. 154(b) by 192 days.

(21) Appl. No.: 17/751,405

(22) Filed: May 23, 2022

(65) Prior Publication Data
US 2023/0254448 A1  Aug. 10, 2023

Related U.S. Application Data

(60) Provisional application No. 63/308,864, filed on Feb. 10, 2022.

(51) Int. Cl.
*H04N 7/15* (2006.01)
*G06V 40/16* (2022.01)
(Continued)

(52) U.S. Cl.
CPC ........... *H04N 7/157* (2013.01); *G06V 40/176* (2022.01); *G10L 15/25* (2013.01); *H04L 12/1822* (2013.01); *H04N 7/152* (2013.01)

(58) Field of Classification Search
CPC ... H04N 7/157; G06V 40/176; H04L 12/1822
See application file for complete search history.

(56) References Cited

U.S. PATENT DOCUMENTS 8,156,060 B2   4/2012  Borzestowski et al.
9,665,567 B2   5/2017  Li et al.
(Continued)

FOREIGN PATENT DOCUMENTS

CN   110598671 A   12/2019
CN   111316203 A   6/2020
WO   2020/010530 A1   1/2020

OTHER PUBLICATIONS

Fitzpatrick, Aidan, "Introducing Camo 1.5: AR modes", Available Online at: "https://reincubate.com/blog/camo-ar-modes-release/", Oct. 28, 2021, 8 pages.
(Continued)

*Primary Examiner* — Amal S Zenati
(74) *Attorney, Agent, or Firm* — DLA Piper LLP (US)

(57) ABSTRACT

An example process includes receiving, from a user, an input corresponding to a request to render, without using a camera, and during a communication session with an external electronic device, an avatar associated with the user; and in accordance with receiving the input: in accordance with a determination that the electronic device is coupled to an external accessory device: during the communication session with the external electronic device, and while a camera corresponding to the communication session is disabled: receiving, from the external accessory device, a first data stream detected by a first type of sensor of the external accessory device; determining, based on the first data stream, a first set of data representing a first type of visual feature of the avatar; and rendering the avatar using the first set of data.

45 Claims, 20 Drawing Sheets

(51) Int. Cl.
  *G10L 15/25* (2013.01)
  *H04L 12/18* (2006.01)

(56) References Cited

U.S. PATENT DOCUMENTS

| | | |
|---|---|---|
| 10,360,716 B1 | 7/2019 | Van Der Meulen et al. |
| 10,521,946 B1 | 12/2019 | Roche et al. |
| 10,586,369 B1 | 3/2020 | Roche et al. |
| 10,904,488 B1 * | 1/2021 | Weisz ................ G06V 10/774 |
| 2009/0055187 A1 | 2/2009 | Leventhal et al. |
| 2010/0082345 A1 | 4/2010 | Wang et al. |
| 2010/0125785 A1 | 5/2010 | Moore et al. |
| 2010/0125811 A1 | 5/2010 | Moore et al. |
| 2011/0064388 A1 | 3/2011 | Brown et al. |
| 2015/0100537 A1 | 4/2015 | Grieves et al. |
| 2015/0312523 A1 * | 10/2015 | Li ........................ G06F 3/0488 348/14.03 |
| 2017/0185581 A1 | 6/2017 | Bojja et al. |
| 2018/0107945 A1 | 4/2018 | Gao et al. |
| 2018/0336184 A1 | 11/2018 | Bellegarda et al. |
| 2019/0172243 A1 | 6/2019 | Mishra et al. |
| 2019/0213774 A1 | 7/2019 | Jiao et al. |
| 2019/0340419 A1 * | 11/2019 | Milman ................ G06N 20/00 |
| 2020/0090393 A1 | 3/2020 | Shin et al. |
| 2020/0135226 A1 | 4/2020 | Mittal et al. |
| 2020/0357406 A1 | 11/2020 | York et al. |
| 2021/0090314 A1 | 3/2021 | Hussen et al. |
| 2021/0248804 A1 | 8/2021 | Hussen Abdelaziz et al. |
| 2021/0249009 A1 | 8/2021 | Manjunath et al. |
| 2021/0281965 A1 | 9/2021 | Malik et al. |
| 2022/0068278 A1 | 3/2022 | York et al. |
| 2022/0277505 A1 * | 9/2022 | Baszucki ................ G06T 13/40 |
| 2023/0199147 A1 * | 6/2023 | Desserrey ............ H04L 51/046 348/14.08 |

OTHER PUBLICATIONS

Malcangi Mario, "Text-driven avatars based on artificial neural networks and fuzzy logic", International Journal of Computers, vol. 4, No. 2, Dec. 31, 2010, pp. 61-69.

* cited by examiner

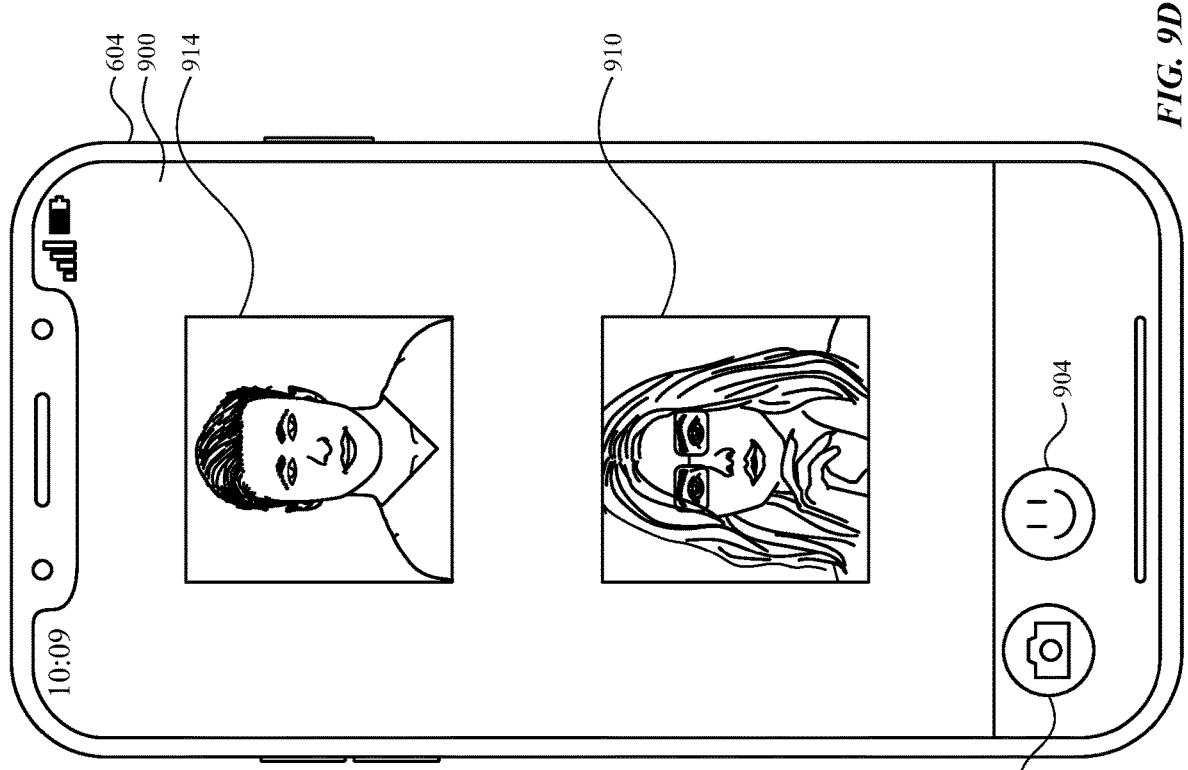
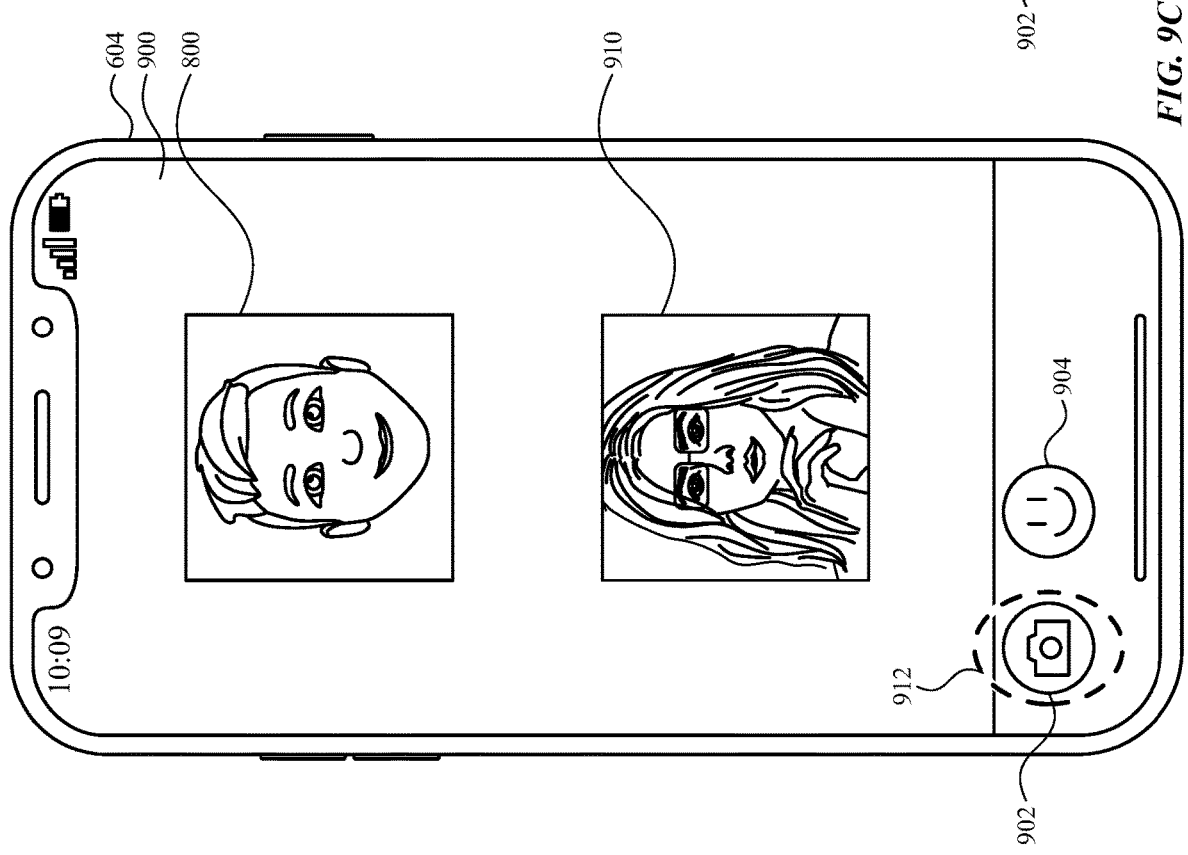
FIG. 9C
FIG. 9D

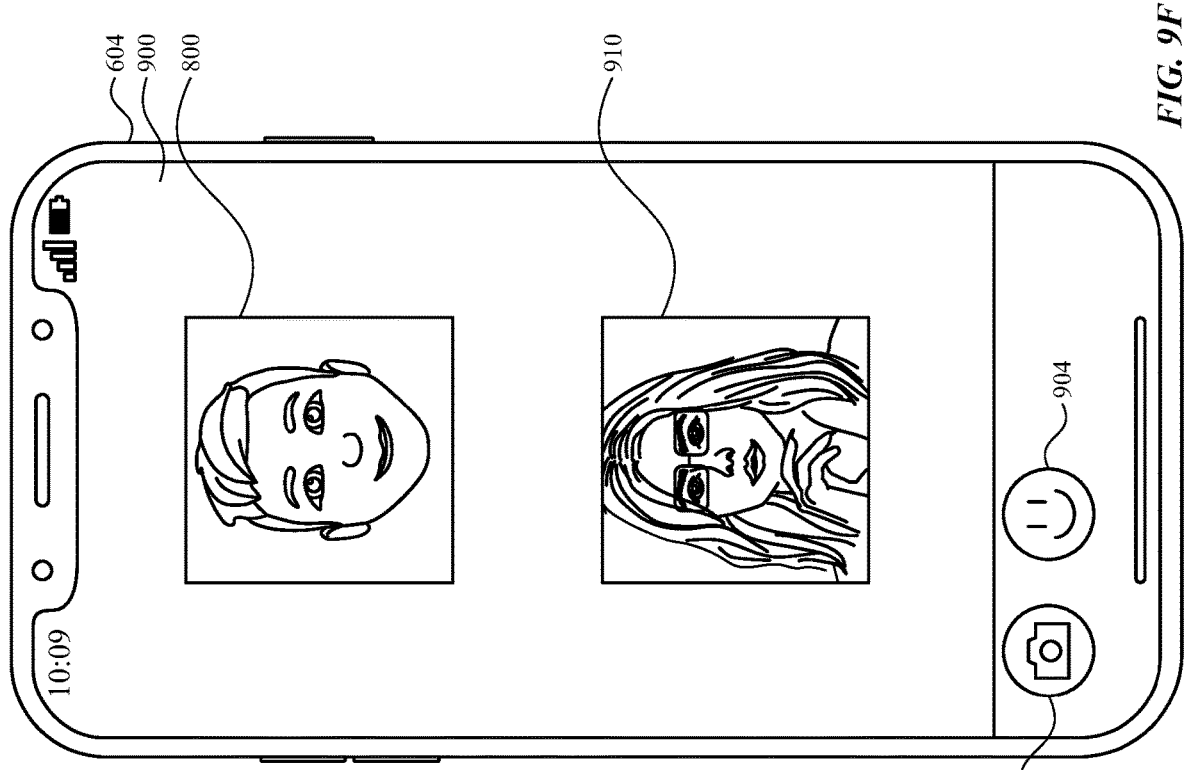
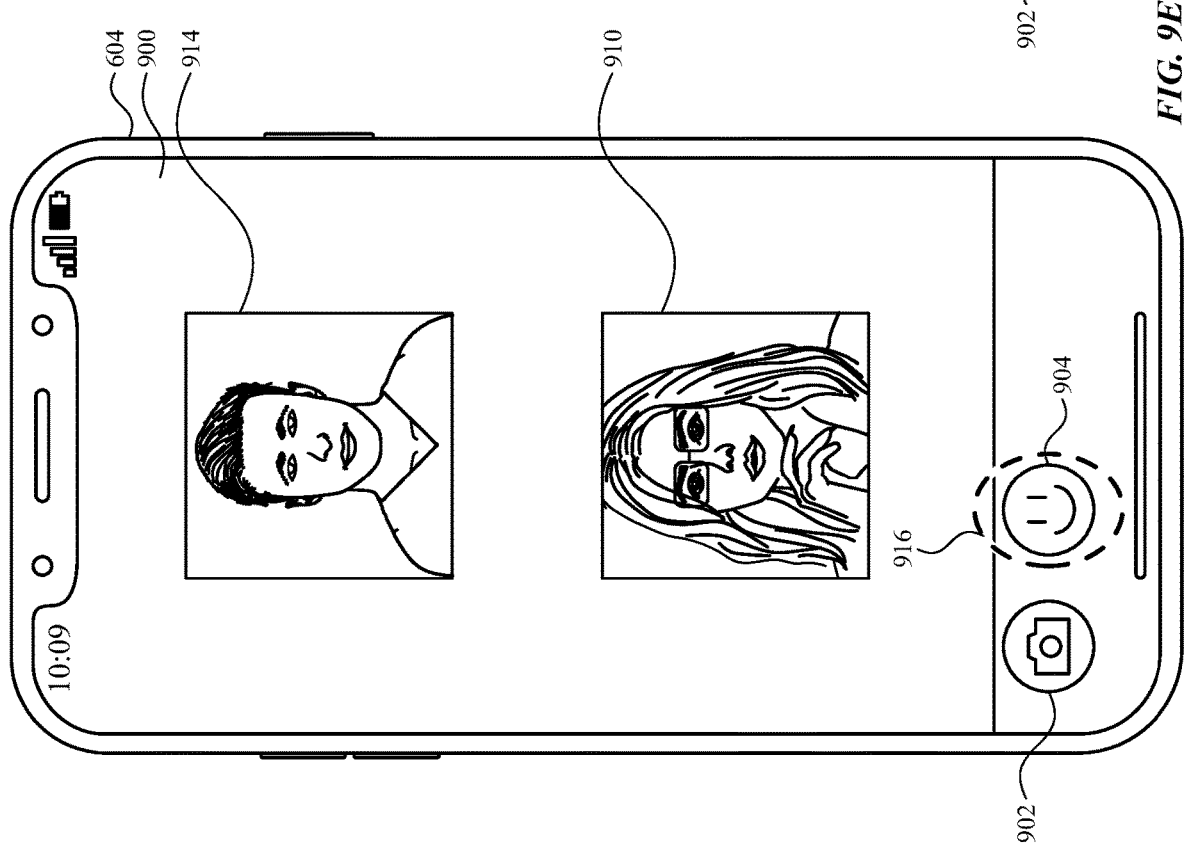

CAMERA-LESS REPRESENTATION OF USERS DURING COMMUNICATION SESSIONS

CROSS-REFERENCE TO RELATED APPLICATIONS

This application claims priority to U.S. Provisional Patent No. 63/308,864, entitled "CAMERA-LESS REPRESENTATION OF USERS DURING COMMUNICATION SESSIONS," filed on Feb. 10, 2022, the content of which is hereby incorporated by reference in its entirety.

FIELD

The present disclosure relates generally to avatar animation.

BACKGROUND

Avatars are used to represent the users of electronic devices. The avatars can represent the appearance of a user or can represent an idealized or completely fictional representation of the user. Avatars can then be associated with a user so that the appearance of the avatar to others triggers an association or link with the user. Avatars can be created and edited for such use, including use in communication sessions, e.g., video calls or video conferences.

BRIEF SUMMARY

Example methods are disclosed herein. An example method includes, at an electronic device with one or more processors and memory: receiving, from a user, an input corresponding to a request to render, without using a camera, and during a communication session with an external electronic device, an avatar associated with the user; and in accordance with receiving the input: in accordance with a determination that the electronic device is coupled to an external accessory device: during the communication session with the external electronic device, and while a camera corresponding to the communication session is disabled: receiving, from the external accessory device, a first data stream detected by a first type of sensor of the external accessory device; determining, based on the first data stream, a first set of data representing a first type of visual feature of the avatar; and rendering the avatar using the first set of data.

Example non-transitory computer-readable media are disclosed herein. An example non-transitory computer-readable storage medium stores one or more programs. The one or more programs comprise instructions, which when executed by one or more processors of an electronic device, cause the electronic device to: receive, from a user, an input corresponding to a request to render, without using a camera, and during a communication session with an external electronic device, an avatar associated with the user; and in accordance with receiving the input: in accordance with a determination that the electronic device is coupled to an external accessory device: during the communication session with the external electronic device, and while a camera corresponding to the communication session is disabled: receive, from the external accessory device, a first data stream detected by a first type of sensor of the external accessory device; determine, based on the first data stream, a first set of data representing a first type of visual feature of the avatar; and render the avatar using the first set of data.

Example electronic devices are disclosed herein. An example electronic device comprises one or more processors; a memory; and one or more programs, where the one or more programs are stored in the memory and configured to be executed by the one or more processors, the one or more programs including instructions for: receiving, from a user, an input corresponding to a request to render, without using a camera, and during a communication session with an external electronic device, an avatar associated with the user; and in accordance with receiving the input: in accordance with a determination that the electronic device is coupled to an external accessory device: during the communication session with the external electronic device, and while a camera corresponding to the communication session is disabled: receiving, from the external accessory device, a first data stream detected by a first type of sensor of the external accessory device; determining, based on the first data stream, a first set of data representing a first type of visual feature of the avatar; and rendering the avatar using the first set of data.

An example electronic device comprises means for: receiving, from a user, an input corresponding to a request to render, without using a camera, and during a communication session with an external electronic device, an avatar associated with the user; and in accordance with receiving the input: in accordance with a determination that the electronic device is coupled to an external accessory device: during the communication session with the external electronic device, and while a camera corresponding to the communication session is disabled: receiving, from the external accessory device, a first data stream detected by a first type of sensor of the external accessory device; determining, based on the first data stream, a first set of data representing a first type of visual feature of the avatar; and rendering the avatar using the first set of data.

Example methods are disclosed herein. An example method includes, at an electronic device with one or more processors and memory: receiving a first data stream detected by a motion sensor; receiving a second data stream detected by an audio sensor; determining, based on the first data stream, a first set of data representing a pose of an avatar associated with a user of the electronic device; determining, based on the second data stream, a second set of data representing a first type of facial feature of the avatar; and rendering the avatar using the first set of data and the second set of data.

Example non-transitory computer-readable media are disclosed herein. An example non-transitory computer-readable storage medium stores one or more programs. The one or more programs comprise instructions, which when executed by one or more processors of an electronic device, cause the electronic device to: receive a first data stream detected by a motion sensor; receive a second data stream detected by an audio sensor; determine, based on the first data stream, a first set of data representing a pose of an avatar associated with a user of the electronic device; determine, based on the second data stream, a second set of data representing a first type of facial feature of the avatar; and render the avatar using the first set of data and the second set of data.

Example electronic devices are disclosed herein. An example electronic device comprises one or more processors; a memory; and one or more programs, where the one or more programs are stored in the memory and configured to be executed by the one or more processors, the one or more programs including instructions for: receiving a first data stream detected by a motion sensor; receiving a second data stream detected by an audio sensor; determining, based on the first data stream, a first set of data representing a pose of an avatar associated with a user of the electronic device; determining, based on the second data stream, a second set of data representing a first type of facial feature of the avatar; and rendering the avatar using the first set of data and the second set of data.

An example electronic device comprises means for: receiving a first data stream detected by a motion sensor; receiving a second data stream detected by an audio sensor; determining, based on the first data stream, a first set of data representing a pose of an avatar associated with a user of the electronic device; determining, based on the second data stream, a second set of data representing a first type of facial feature of the avatar; and rendering the avatar using the first set of data and the second set of data.

Rendering the avatar when a set of conditions has been met allows a device to accurately and efficiently animate an avatar associated with a user. Thus, during a communication session, the user can have a live displayed presence via the rendered avatar without activating any camera(s) corresponding to the communication session. For example, the device can render the avatar with visual features (e.g., pose, mouth movements, emotional state) corresponding to the user's visual features, but without using any camera data. In this manner, user fatigue associated with participating in communication sessions (e.g., caused by viewing video of the user and/or of other participant(s) in the communication session) may be reduced. Additionally, rendering the avatar as described herein may improve user privacy and device security, e.g., by preventing transmission of video of the user to other devices and by preventing applications (e.g., provided by third party services) from accessing the device's camera data. Accordingly, rendering the avatar when a set of conditions has been met (e.g., without requiring further user input) enhances the operability of the device and makes the user-device interface more efficient and secure (e.g., by reducing the number of user inputs required for the device to accurately render the avatar, by reducing cognitive burden on the user when interacting with the device, by preventing applications and/or other devices from accessing the device's camera data, by reducing device battery, memory, processing, and/or networking resources otherwise consumed by detecting and transmitting camera data) which, additionally, reduces power usage and improves battery life of the device by enabling the user to use the device more quickly and efficiently.

Thus, devices are provided with faster, more efficient methods and interfaces for avatar animation, thereby increasing the effectiveness, efficiency, and user satisfaction with such devices. Such methods and interfaces may complement or replace other methods for avatar animation.

DESCRIPTION OF THE FIGURES

For a better understanding of the various described embodiments, reference should be made to the Description of Embodiments below, in conjunction with the following drawings in which like reference numerals refer to corresponding parts throughout the figures.

FIGS. 9A-9G illustrate various user interfaces associated with rendering an avatar, in accordance with some embodiments.

DESCRIPTION OF EMBODIMENTS

Figure 1A:
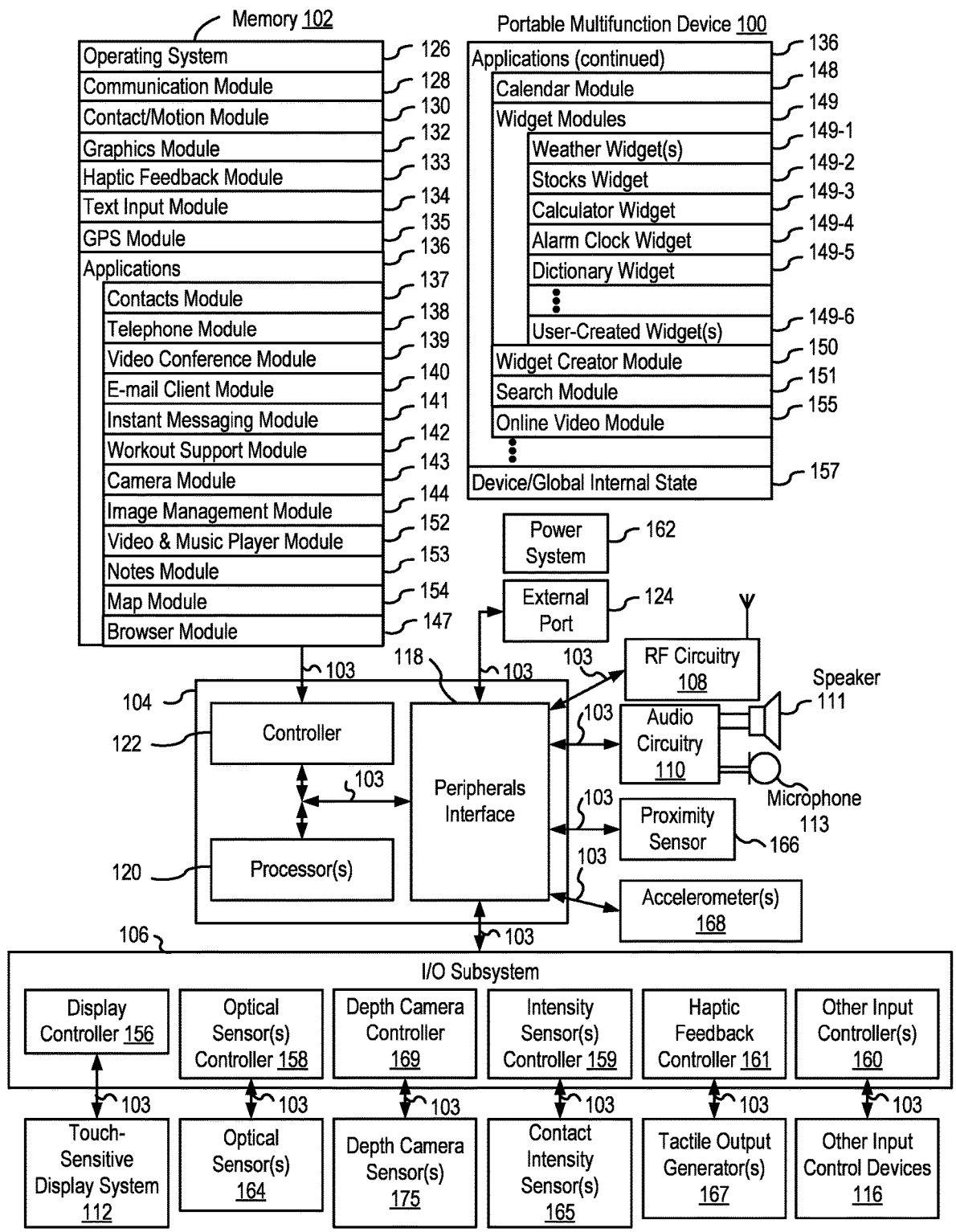
FIG. 1A is a block diagram illustrating a portable multifunction device with a touch-sensitive display in accordance with some embodiments.

The following description sets forth exemplary methods, parameters, and the like. It should be recognized, however, that such description is not intended as a limitation on the scope of the present disclosure but is instead provided as a description of exemplary embodiments.

There is a need for electronic devices that provide efficient methods and interfaces for avatar animation. Such techniques can reduce the cognitive burden on users who participate in communication sessions, thereby enhancing productivity. Further, such techniques can reduce processor and battery power otherwise wasted on redundant user inputs.

Below, FIGS. 1A-1B, 2, 3, 4A-4B, and 5A-5B provide a description of exemplary devices for performing the techniques for avatar animation. FIGS. 6, 7, 8, and 9A-9G illustrate exemplary systems, techniques, and user interfaces for avatar animation. FIGS. 10A-10B and FIGS. 11A-11C are flow diagrams illustrating respective processes for avatar animation. FIGS. 6, 7, 8, and 9A-9G are used to illustrate the processes described below, including the processes in FIGS. 10A-10B and FIGS. 11A-11C.

The processes described below enhance the operability of the devices and make the user-device interfaces more efficient (e.g., by helping the user to provide proper inputs and reducing user mistakes when operating/interacting with the device) through various techniques, including by providing improved visual feedback to the user, reducing the number of inputs needed to perform an operation, providing additional control options without cluttering the user interface with additional displayed controls, performing an operation when a set of conditions has been met without requiring further user input, increasing device security, and/or preserving user privacy. These techniques also reduce power usage and improve battery life of the device by enabling the user to use the device more quickly and efficiently.

In addition, in methods described herein where one or more steps are contingent upon one or more conditions having been met, it should be understood that the described method can be repeated in multiple repetitions so that over the course of the repetitions all of the conditions upon which steps in the method are contingent have been met in different repetitions of the method. For example, if a method requires performing a first step if a condition is satisfied, and a second step if the condition is not satisfied, then a person of ordinary skill would appreciate that the claimed steps are repeated until the condition has been both satisfied and not satisfied, in no particular order. Thus, a method described with one or more steps that are contingent upon one or more conditions having been met could be rewritten as a method that is repeated until each of the conditions described in the method has been met. This, however, is not required of system or computer readable medium claims where the system or computer readable medium contains instructions for performing the contingent operations based on the satisfaction of the corresponding one or more conditions and thus is capable of determining whether the contingency has or has not been satisfied without explicitly repeating steps of a method until all of the conditions upon which steps in the method are contingent have been met. A person having ordinary skill in the art would also understand that, similar to a method with contingent steps, a system or computer readable storage medium can repeat the steps of a method as many times as are needed to ensure that all of the contingent steps have been performed.

Although the following description uses terms "first," "second," etc. to describe various elements, these elements should not be limited by the terms. In some embodiments, these terms are used to distinguish one element from another. For example, a first touch could be termed a second touch, and, similarly, a second touch could be termed a first touch, without departing from the scope of the various described embodiments. In some embodiments, the first touch and the second touch are two separate references to the same touch. In some embodiments, the first touch and the second touch are both touches, but they are not the same touch.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, California. Other portable electronic devices, such as laptops or tablet computers with touch-sensitive surfaces (e.g., touch screen displays and/or touchpads), are, optionally, used. It should also be understood that, in some embodiments, the device is not a portable communications device, but is a desktop computer with a touch-sensitive surface (e.g., a touch screen display and/or a touchpad). In some embodiments, the electronic device is a computer system that is in communication (e.g., via wireless communication, via wired communication) with a display generation component. The display generation component is configured to provide visual output, such as display via a CRT display, display via an LED display, or display via image projection. In some embodiments, the display generation component is integrated with the computer system. In some embodiments, the display generation component is separate from the computer system. As used herein, "displaying" content includes causing to display the content (e.g., video data rendered or decoded by display controller 156) by transmitting, via a wired or wireless connection, data (e.g., image data or video data) to an integrated or external display generation component to visually produce the content.

In the discussion that follows, an electronic device that includes a display and a touch-sensitive surface is described. It should be understood, however, that the electronic device optionally includes one or more other physical user-interface devices, such as a physical keyboard, a mouse, and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display 112 is sometimes called a "touch screen" for convenience and is sometimes known as or called a "touch-sensitive display system." Device 100 includes memory 102 (which optionally includes one or more computer-readable storage mediums), memory controller 122, one or more processing units (CPUs) 120, peripherals interface 118, RF circuitry 108, audio circuitry 110, speaker 111, microphone 113, input/ output (I/O) subsystem 106, other input control devices 116, and external port 124. Device 100 optionally includes one or more optical sensors 164. Device 100 optionally includes one or more contact intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure, and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application-specific integrated circuits.

Memory 102 optionally includes high-speed random access memory and optionally also includes non-volatile memory, such as one or more magnetic disk storage devices, flash memory devices, or other non-volatile solid-state memory devices. Memory controller 122 optionally controls access to memory 102 by other components of device 100.

Peripherals interface 118 can be used to couple input and output peripherals of the device to CPU 120 and memory 102. The one or more processors 120 run or execute various software programs (such as computer programs (e.g., including instructions)) and/or sets of instructions stored in memory 102 to perform various functions for device 100 and to process data. In some embodiments, peripherals interface 118, CPU 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The RF circuitry 108 optionally includes well-known circuitry for detecting near field communication (NFC) fields, such as by a short-range communication radio. The wireless communication optionally uses any of a plurality of communications standards, protocols, and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Bluetooth Low Energy (BTLE), Wireless Fidelity (Wi-Fi) (e.g., IEEE 802.11a, IEEE 802.11b, IEEE 802.11g, IEEE 802.11n, and/or IEEE 802.11ac), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, depth camera controller 169, intensity sensor controller 159, haptic feedback controller 161, and one or more input controllers 160 for other input or control devices. The one or more input controllers 160 receive/send electrical signals from/to other input control devices 116. The other input control devices 116 optionally include physical buttons (e.g., push buttons, rocker buttons, etc.), dials, slider switches, joysticks, click wheels, and so forth. In some embodiments, input controller(s) 160 are, optionally, coupled to any (or none) of the following: a keyboard, an infrared port, a USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2). In some embodiments, the electronic device is a computer system that is in communication (e.g., via wireless communication, via wired communication) with one or more input devices. In some embodiments, the one or more input devices include a touch-sensitive surface (e.g., a trackpad, as part of a touch-sensitive display). In some embodiments, the one or more input devices include one or more camera sensors (e.g., one or more optical sensors 164 and/or one or more depth camera sensors 175), such as for tracking a user's gestures (e.g., hand gestures and/or air gestures) as input. In some embodiments, the one or more input devices are integrated with the computer system. In some embodiments, the one or more input devices are separate from the computer system. In some embodiments, an air gesture is a gesture that is detected without the user touching an input element that is part of the device (or independently of an input element that is a part of the device) and is based on detected motion of a portion of the user's body through the air including motion of the user's body relative to an absolute reference (e.g., an angle of the user's arm relative to the ground or a distance of the user's hand relative to the ground), relative to another portion of the user's body (e.g., movement of a hand of the user relative to a shoulder of the user, movement of one hand of the user relative to another hand of the user, and/or movement of a finger of the user relative to another finger or portion of a hand of the user), and/or absolute motion of a portion of the user's body (e.g., a tap gesture that includes movement of a hand in a predetermined pose by a predetermined amount and/or speed, or a shake gesture that includes a predetermined speed or amount of rotation of a portion of the user's body).

A quick press of the push button optionally disengages a lock of touch screen 112 or optionally begins a process that uses gestures on the touch screen to unlock the device, as described in U.S. patent application Ser. No. 11/322,549, "Unlocking a Device by Performing Gestures on an Unlock Image," filed Dec. 23, 2005, U.S. Pat. No. 7,657,849, which is hereby incorporated by reference in its entirety. A longer press of the push button (e.g., 206) optionally turns power to device 100 on or off. The functionality of one or more of the buttons are, optionally, user-customizable. Touch screen 112 is used to implement virtual or soft buttons and one or more soft keyboards.

Touch-sensitive display 112 provides an input interface and an output interface between the device and a user. Display controller 156 receives and/or sends electrical signals from/to touch screen 112. Touch screen 112 displays visual output to the user. The visual output optionally includes graphics, text, icons, video, and any combination thereof (collectively termed "graphics"). In some embodiments, some or all of the visual output optionally corresponds to user-interface objects.

Touch screen 112 has a touch-sensitive surface, sensor, or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and convert the detected contact into interaction with user-interface objects (e.g., one or more soft keys, icons, web pages, or images) that are displayed on touch screen 112. In an exemplary embodiment, a point of contact between touch screen 112 and the user corresponds to a finger of the user.

Touch screen 112 optionally uses LCD (liquid crystal display) technology, LPD (light emitting polymer display) technology, or LED (light emitting diode) technology, although other display technologies are used in other embodiments. Touch screen 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone® and iPod Touch® from Apple Inc. of Cupertino, California.

A touch-sensitive display in some embodiments of touch screen 112 is, optionally, analogous to the multi-touch sensitive touchpads described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, touch screen 112 displays visual output from device 100, whereas touch-sensitive touchpads do not provide visual output.

A touch-sensitive display in some embodiments of touch screen 112 is described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 112 optionally has a video resolution in excess of 100 dpi. In some embodiments, the touch screen has a video resolution of approximately 160 dpi. The user optionally makes contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad for activating or deactivating particular functions. In some embodiments, the touchpad is a touch-sensitive area of the device that, unlike the touch screen, does not display visual output. The touchpad is, optionally, a touch-sensitive surface that is separate from touch screen 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled to optical sensor controller 158 in I/O subsystem 106. Optical sensor 164 optionally includes charge-coupled device (CCD) or complementary metal-oxide semiconductor (CMOS) phototransistors. Optical sensor 164 receives light from the environment, projected through one or more lenses, and converts the light to data representing an image. In conjunction with imaging module 143 (also called a camera module), optical sensor 164 optionally captures still images or video. In some embodiments, an optical sensor is located on the back of device 100, opposite touch screen display 112 on the front of the device so that the touch screen display is enabled for use as a viewfinder for still and/or video image acquisition. In some embodiments, an optical sensor is located on the front of the device so that the user's image is, optionally, obtained for video conferencing while the user views the other video conference participants on the touch screen display. In some embodiments, the position of optical sensor 164 can be changed by the user (e.g., by rotating the lens and the sensor in the device housing) so that a single optical sensor 164 is used along with the touch screen display for both video conferencing and still and/or video image acquisition.

Device 100 optionally also includes one or more depth camera sensors 175. FIG. 1A shows a depth camera sensor coupled to depth camera controller 169 in I/O subsystem 106. Depth camera sensor 175 receives data from the environment to create a three dimensional model of an object (e.g., a face) within a scene from a viewpoint (e.g., a depth camera sensor). In some embodiments, in conjunction with imaging module 143 (also called a camera module), depth camera sensor 175 is optionally used to determine a depth map of different portions of an image captured by the imaging module 143. In some embodiments, a depth camera sensor is located on the front of device 100 so that the user's image with depth information is, optionally, obtained for video conferencing while the user views the other video conference participants on the touch screen display and to capture selfies with depth map data. In some embodiments, the depth camera sensor 175 is located on the back of device, or on the back and the front of the device 100. In some embodiments, the position of depth camera sensor 175 can be changed by the user (e.g., by rotating the lens and the sensor in the device housing) so that a depth camera sensor 175 is used along with the touch screen display for both video conferencing and still and/or video image acquisition.

In some embodiments, a depth map (e.g., depth map image) contains information (e.g., values) that relates to the distance of objects in a scene from a viewpoint (e.g., an optical sensor, a depth camera sensor). In one embodiment of a depth map, each depth pixel defines the position in the viewpoint's Z-axis where its corresponding two-dimensional pixel is located. In some embodiments, a depth map is composed of pixels wherein each pixel is defined by a value (e.g., 0-255). For example, the "0" value represents pixels that are located at the most distant place in a "three dimensional" scene and the "255" value represents pixels that are located closest to a viewpoint (e.g., an optical sensor, a depth camera sensor) in the "three dimensional" scene. In other embodiments, a depth map represents the distance between an object in a scene and the plane of the viewpoint. In some embodiments, the depth map includes information about the relative depth of various features of an object of interest in view of the depth camera (e.g., the relative depth of eyes, nose, mouth, ears of a user's face). In some embodiments, the depth map includes information that enables the device to determine contours of the object of interest in a z direction.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112, which is located on the front of device 100.

Device 100 optionally also includes one or more proximity sensors 166. FIG. 1A shows proximity sensor 166 coupled to peripherals interface 118. Alternately, proximity sensor 166 is, optionally, coupled to input controller 160 in I/O subsystem 106. Proximity sensor 166 optionally performs as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112, which is located on the front of device 100.

Device 100 optionally also includes one or more accelerometers 168. FIG. 1A shows accelerometer 168 coupled to peripherals interface 118. Alternately, accelerometer 168 is, optionally, coupled to an input controller 160 in I/O subsystem 106. Accelerometer 168 optionally performs as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are incorporated by reference herein in their entirety. In some embodiments, information is displayed on the touch screen display in a portrait view or a landscape view based on an analysis of data received from the one or more accelerometers. Device 100 optionally includes, in addition to accelerometer(s) 168, a magnetometer and a GPS (or GLONASS or other global navigation system) receiver for obtaining information concerning the location and orientation (e.g., portrait or landscape) of device 100.

Figure 3:
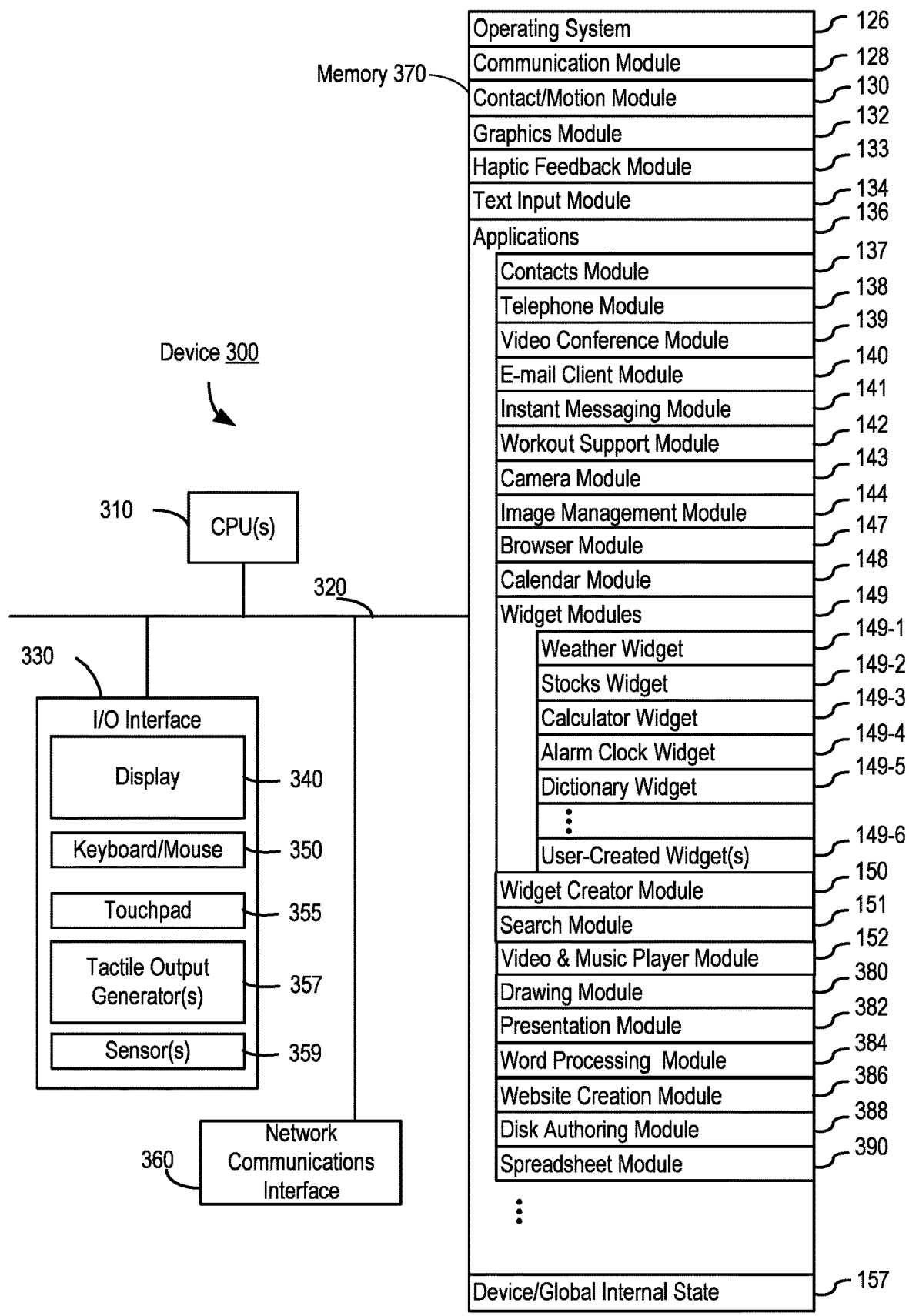
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments, memory 102 (FIG. 1A) or 370 (FIG. 3) stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, iOS, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIRE-WIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with, the 30-pin connector used on iPod® (trademark of Apple Inc.) devices.

Contact/motion module 130 optionally detects contact with touch screen 112 (in conjunction with display controller 156) and other touch-sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined threshold values without changing the trackpad or touch screen display hardware. Additionally, in some implementations, a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (liftoff) event.

Graphics module 132 includes various known software components for rendering and displaying graphics on touch screen 112 or other display, including components for changing the visual impact (e.g., brightness, transparency, saturation, contrast, or other visual property) of graphics that are displayed. As used herein, the term "graphics" includes any object that can be displayed to a user, including, without limitation, text, web pages, icons (such as user-interface objects including soft keys), digital images, videos, animations, and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone module 138 for use in location-based dialing; to camera module 143 as picture/video metadata; and to applications that provide location-based services such as weather widgets, local yellow page widgets, and map/navigation widgets).

Applications 136 optionally include the following modules (or sets of instructions), or a subset or superset thereof:
 Contacts module 137 (sometimes called an address book or contact list);
 Telephone module 138;
 Video conference module 139;
 E-mail client module 140;
 Instant messaging (IM) module 141;
 Workout support module 142;
 Camera module 143 for still and/or video images;
 Image management module 144;
 Video player module;
 Music player module;
 Browser module 147;
 Calendar module 148;
 Widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
 Widget creator module 150 for making user-created widgets 149-6;
 Search module 151;
 Video and music player module 152, which merges video player module and music player module;
 Notes module 153;
 Map module 154; and/or
 Online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact/motion module 130, graphics module 132, and text input module 134, contacts module 137 are, optionally, used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference module 139, e-mail 140, or IM 141; and so forth.

In conjunction with RF circuitry 108, audio circuitry 110, speaker 111, microphone 113, touch screen 112, display controller 156, contact/motion module 130, graphics module 132, and text input module 134, telephone module 138 are optionally, used to enter a sequence of characters corresponding to a telephone number, access one or more telephone numbers in contacts module 137, modify a telephone number that has been entered, dial a respective telephone number, conduct a conversation, and disconnect or hang up when the conversation is completed. As noted above, the wireless communication optionally uses any of a plurality of communications standards, protocols, and technologies.

In conjunction with RF circuitry 108, audio circuitry 110, speaker 111, microphone 113, touch screen 112, display controller 156, optical sensor 164, optical sensor controller 158, contact/motion module 130, graphics module 132, text input module 134, contacts module 137, and telephone module 138, video conference module 139 includes executable instructions to initiate, conduct, and terminate a video conference between a user and one or more other participants in accordance with user instructions.

In conjunction with RF circuitry 108, touch screen 112, display controller 156, contact/motion module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact/motion module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages, and to view received instant messages. In some embodiments, transmitted and/or received instant messages optionally include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact/motion module 130, graphics module 132, text input module 134, GPS module 135, map module 154, and music player module, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store, and transmit workout data.

In conjunction with touch screen 112, display controller 156, optical sensor(s) 164, optical sensor controller 158, contact/motion module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact/motion module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display controller 156, contact/motion module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display controller 156, contact/motion module 130, graphics module 132, text input module 134, e-mail client module 140, and browser module 147, calendar module 148 includes executable instructions to create, display, modify, and store calendars and data associated with calendars (e.g., calendar entries, to-do lists, etc.) in accordance with user instructions.

In conjunction with RF circuitry 108, touch screen 112, display controller 156, contact/motion module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display controller 156, contact/motion module 130, graphics module 132, text input module 134, and browser module 147, the widget creator module 150 are, optionally, used by a user to create widgets (e.g., turning a user-specified portion of a web page into a widget).

In conjunction with touch screen 112, display controller 156, contact/motion module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display controller 156, contact/motion module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present, or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact/motion module 130, graphics module 132, and text input module 134, notes module 153 includes executable instructions to create and manage notes, to-do lists, and the like in accordance with user instructions.

In conjunction with RF circuitry 108, touch screen 112, display controller 156, contact/motion module 130, graphics module 132, text input module 134, GPS module 135, and browser module 147, map module 154 are, optionally, used to receive, display, modify, and store maps and data associated with maps (e.g., driving directions, data on stores and other points of interest at or near a particular location, and other location-based data) in accordance with user instructions.

In conjunction with touch screen 112, display controller 156, contact/motion module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the contents of which are hereby incorporated by reference in their entirety.

Each of the above-identified modules and applications corresponds to a set of executable instructions for performing one or more functions described above and the methods described in this application (e.g., the computer-implemented methods and other information processing methods described herein). These modules (e.g., sets of instructions) need not be implemented as separate software programs (such as computer programs (e.g., including instructions)), procedures, or modules, and thus various subsets of these modules are, optionally, combined or otherwise rearranged in various embodiments. For example, video player module is, optionally, combined with music player module into a single module (e.g., video and music player module 152, FIG. 1A). In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
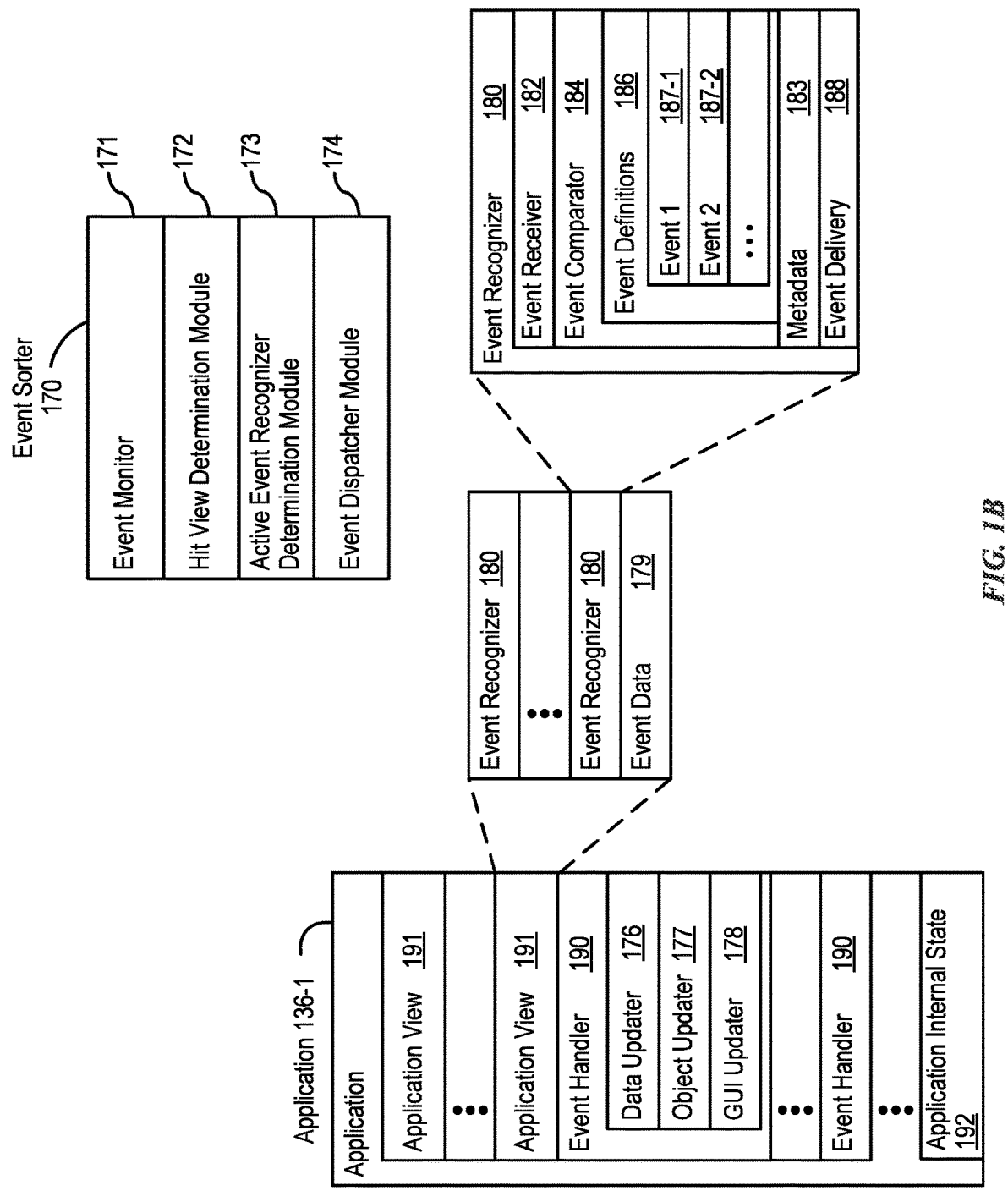
FIG. 1B is a block diagram illustrating exemplary components for event handling in accordance with some embodiments.

FIG. 1B is a block diagram illustrating exemplary components for event handling in accordance with some embodiments. In some embodiments, memory 102 (FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripherals interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views when touch-sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module 172, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177, or GUI updater 178 to update the application internal state 192. Alternatively, one or more of the application views 191 include one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170 and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event (187) include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first liftoff (touch end) for a predetermined phase, a second touch (touch begin) on the displayed object for a predetermined phase, and a second liftoff (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and liftoff of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event (187) also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input devices, not all of which are initiated on touch screens. For example, mouse movement and mouse button presses, optionally coordinated with single or multiple keyboard presses or holds; contact movements such as taps, drags, scrolls, etc. on touchpads; pen stylus inputs; movement of the device; oral instructions; detected eye movements; biometric inputs; and/or any combination thereof are optionally utilized as inputs corresponding to sub-events which define an event to be recognized.

Figure 2:
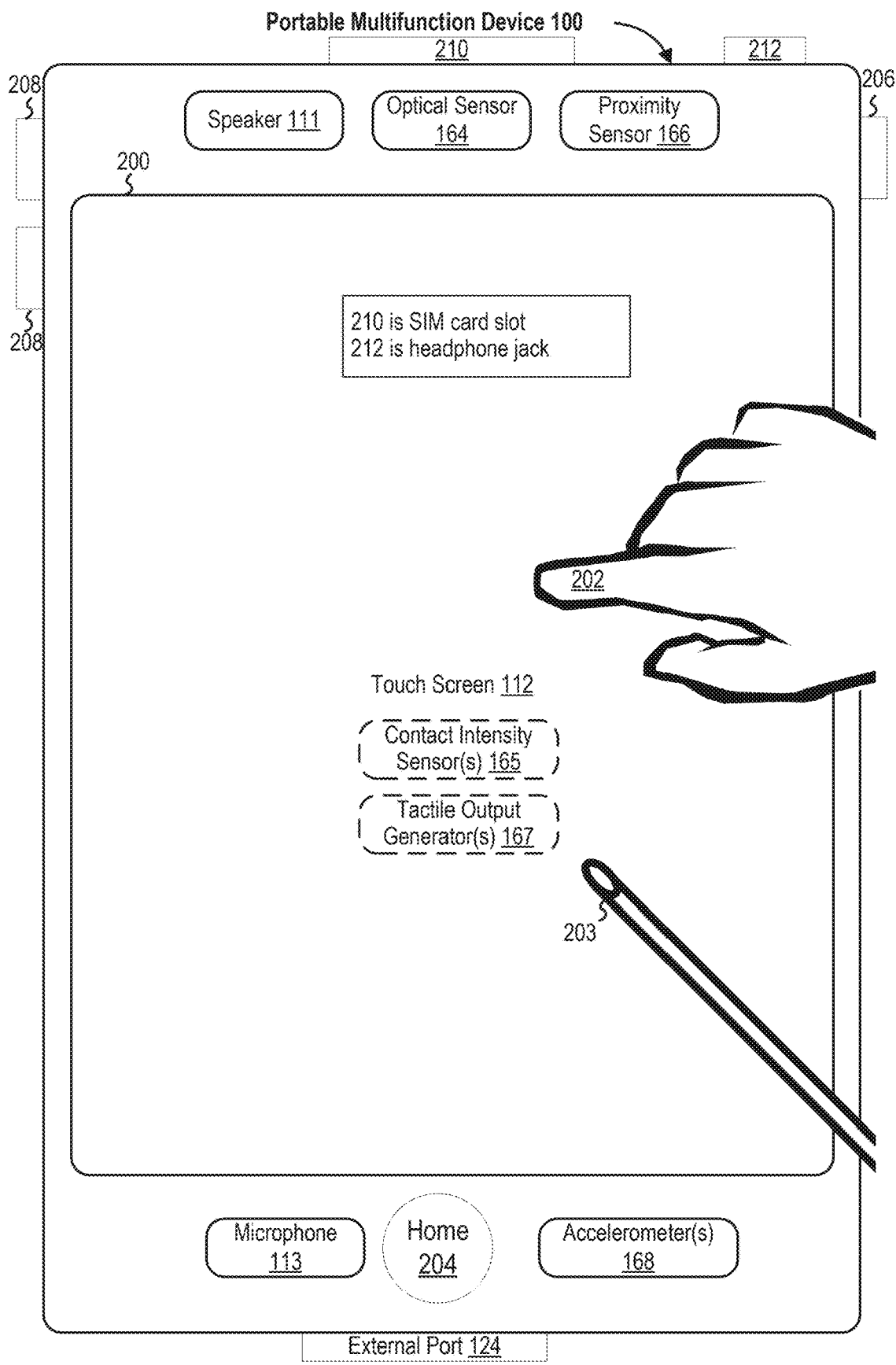
FIG. 2 illustrates a portable multifunction device having a touch screen in accordance with some embodiments.

FIG. 2 illustrates a portable multifunction device 100 having a touch screen 112 in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward), and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also include one or more physical buttons, such as "home" or menu button 204. As described previously, menu button 204 is, optionally, used to navigate to any application 136 in a set of applications that are, optionally, executed on device 100. Alternatively, in some embodiments, the menu button is implemented as a soft key in a GUI displayed on touch screen 112.

In some embodiments, device 100 includes touch screen 112, menu button 204, push button 206 for powering the device on/off and locking the device, volume adjustment button(s) 208, subscriber identity module (SIM) card slot 210, headset jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPUs) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM, or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above-identified elements in FIG. 3 is, optionally, stored in one or more of the previously mentioned memory devices. Each of the above-identified modules corresponds to a set of instructions for performing a function described above. The above-identified modules or computer programs (e.g., sets of instructions or including instructions) need not be implemented as separate software programs (such as computer programs (e.g., including instructions)), procedures, or modules, and thus various subsets of these modules are, optionally, combined or otherwise rearranged in various embodiments. In some embodiments, memory 370 optionally stores a subset of the modules and data structures identified above. Furthermore, memory 370 optionally stores additional modules and data structures not described above.

Attention is now directed towards embodiments of user interfaces that are, optionally, implemented on, for example, portable multifunction device 100.

Figure 4A:
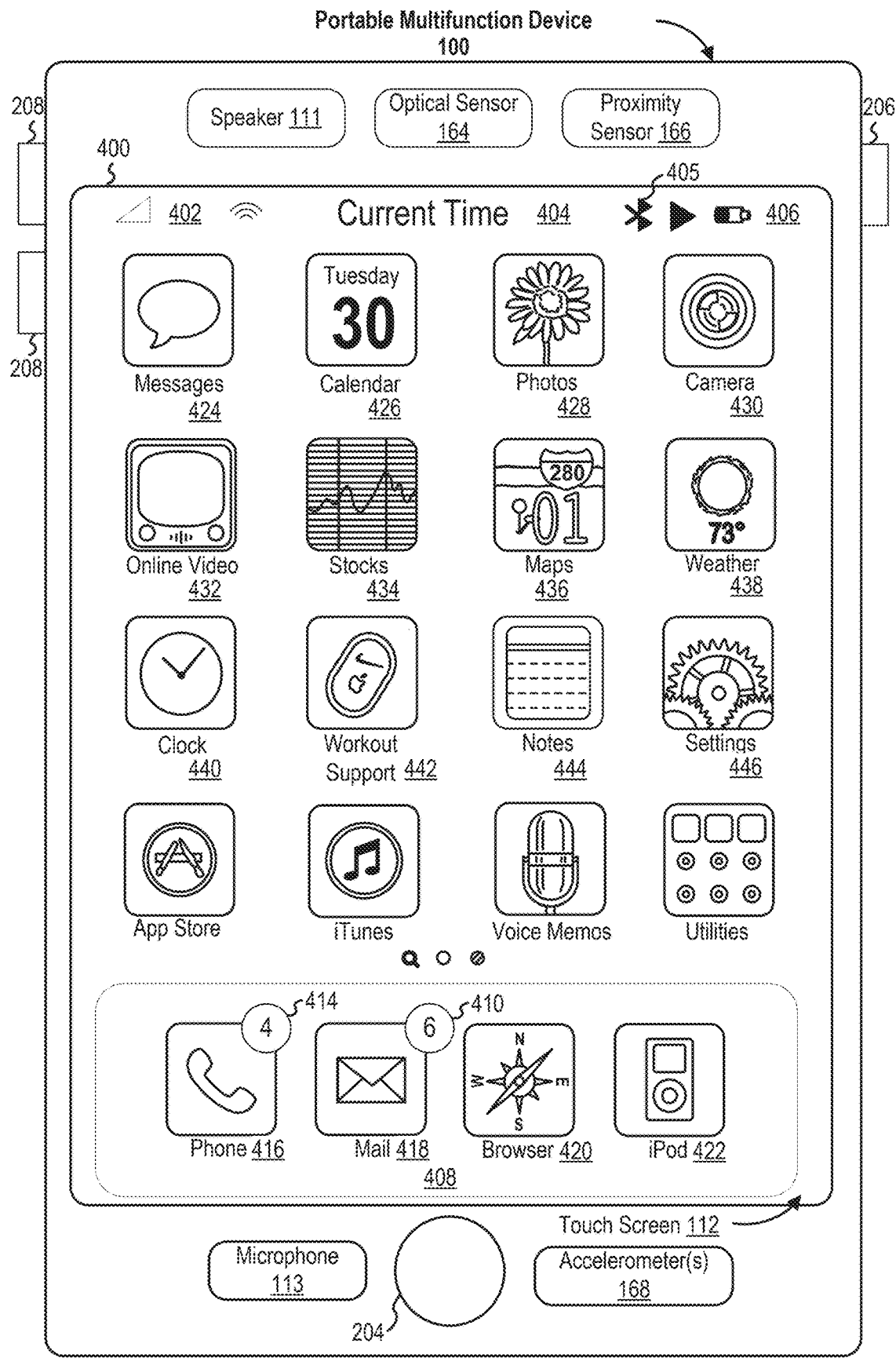
FIG. 4A illustrates an exemplary user interface for a menu of applications on a portable multifunction device in accordance with some embodiments.

FIG. 4A illustrates an exemplary user interface for a menu of applications on portable multifunction device 100 in accordance with some embodiments. Similar user interfaces are, optionally, implemented on device 300. In some embodiments, user interface 400 includes the following elements, or a subset or superset thereof:

Signal strength indicator(s) 402 for wireless communication(s), such as cellular and Wi-Fi signals;
Time 404;
Bluetooth indicator 405;
Battery status indicator 406;
Tray 408 with icons for frequently used applications, such as:
  Icon 416 for telephone module 138, labeled "Phone," which optionally includes an indicator 414 of the number of missed calls or voicemail messages;
  Icon 418 for e-mail client module 140, labeled "Mail," which optionally includes an indicator 410 of the number of unread e-mails;
  Icon 420 for browser module 147, labeled "Browser;" and
  Icon 422 for video and music player module 152, also referred to as iPod (trademark of Apple Inc.) module 152, labeled "iPod;" and
Icons for other applications, such as:
  Icon 424 for IM module 141, labeled "Messages;"
  Icon 426 for calendar module 148, labeled "Calendar;"
  Icon 428 for image management module 144, labeled "Photos;"
  Icon 430 for camera module 143, labeled "Camera;"
  Icon 432 for online video module 155, labeled "Online Video;"
  Icon 434 for stocks widget 149-2, labeled "Stocks;"
  Icon 436 for map module 154, labeled "Maps;"
  Icon 438 for weather widget 149-1, labeled "Weather;"
  Icon 440 for alarm clock widget 149-4, labeled "Clock;"
  Icon 442 for workout support module 142, labeled "Workout Support;"
  Icon 444 for notes module 153, labeled "Notes;" and
  Icon 446 for a settings application or module, labeled "Settings," which provides access to settings for device 100 and its various applications 136.

It should be noted that the icon labels illustrated in FIG. 4A are merely exemplary. For example, icon 422 for video and music player module 152 is labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

Figure 4B:
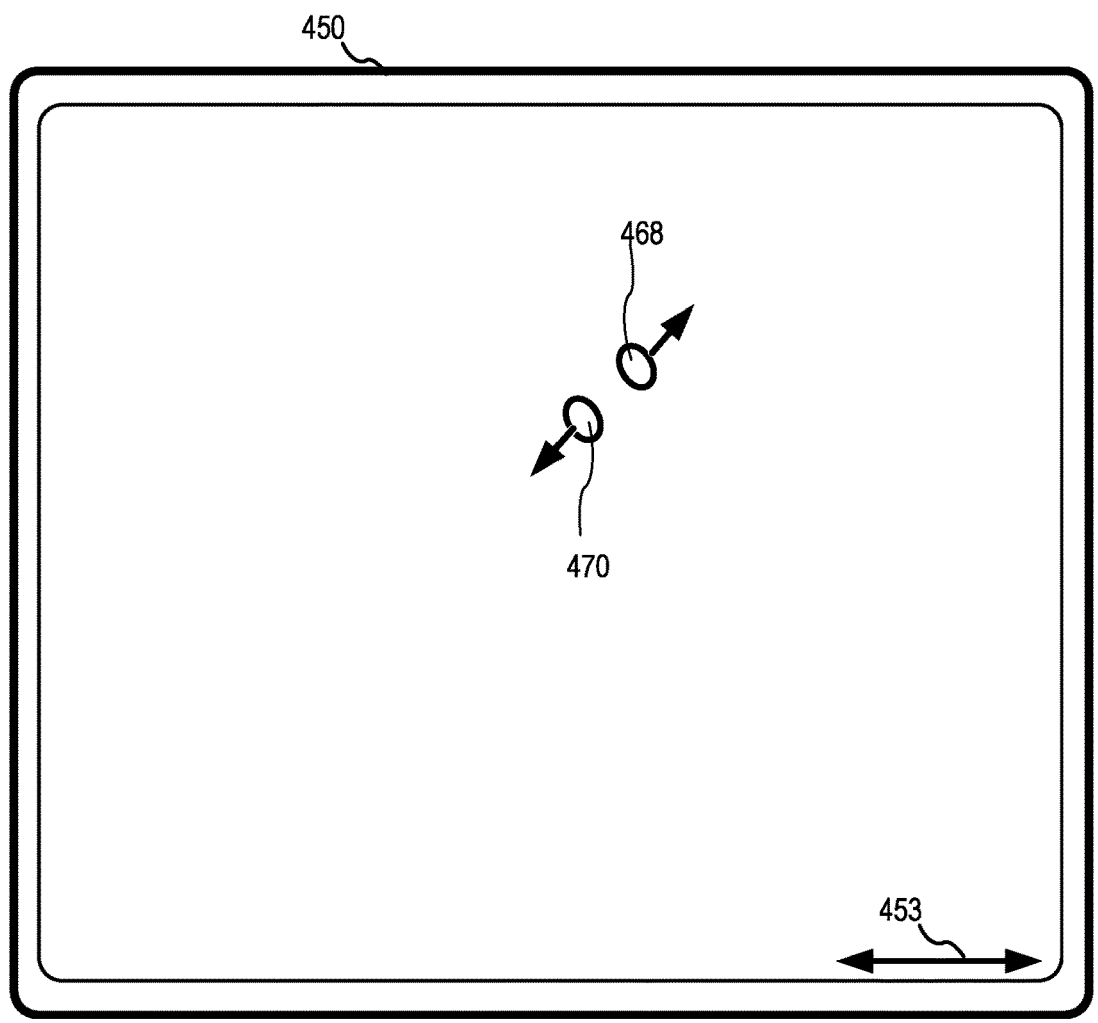
FIG. 4B illustrates an exemplary user interface for a multifunction device with a touch-sensitive surface that is separate from the display in accordance with some embodiments.
Figure 4B:
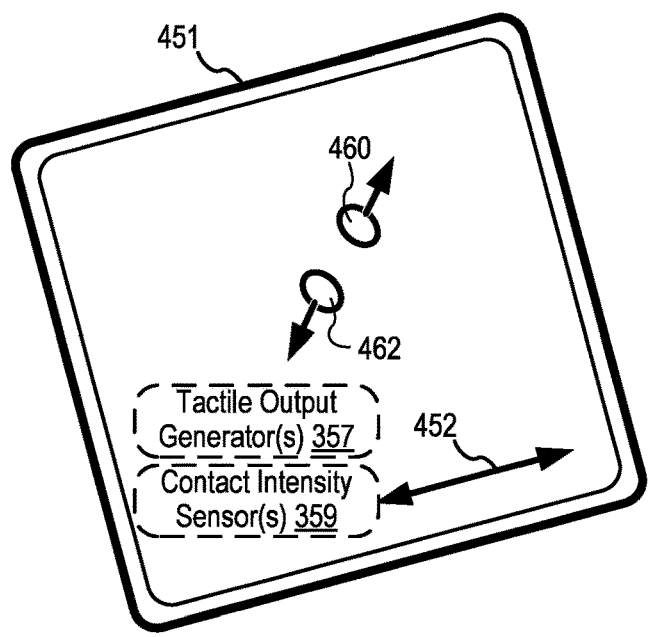

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 359) for detecting intensity of contacts on touch-sensitive surface 451 and/or one or more tactile output generators 357 for generating tactile outputs for a user of device 300.

Although some of the examples that follow will be given with reference to inputs on touch screen display 112 (where the touch-sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse-based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

Figure 5A:
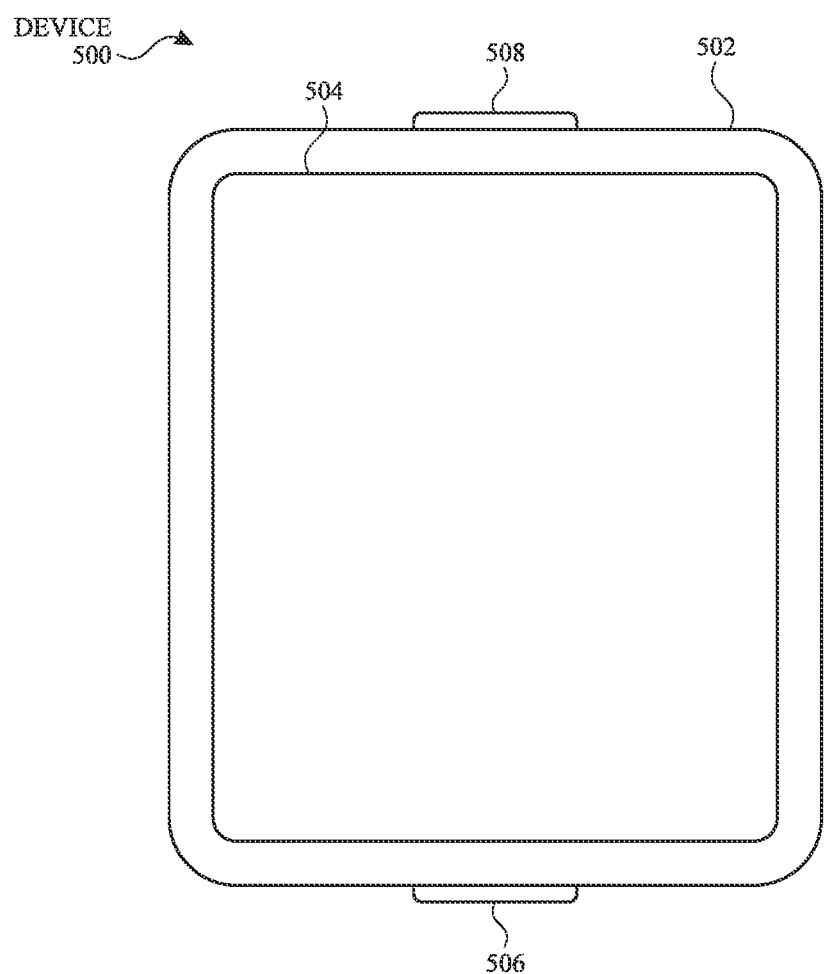
FIG. 5A illustrates a personal electronic device in accordance with some embodiments.

FIG. 5A illustrates exemplary personal electronic device 500. Device 500 includes body 502. In some embodiments, device 500 can include some or all of the features described with respect to devices 100 and 300 (e.g., FIGS. 1A-4B). In some embodiments, device 500 has touch-sensitive display screen 504, hereafter touch screen 504. Alternatively, or in addition to touch screen 504, device 500 has a display and a touch-sensitive surface. As with devices 100 and 300, in some embodiments, touch screen 504 (or the touch-sensitive surface) optionally includes one or more intensity sensors for detecting intensity of contacts (e.g., touches) being applied. The one or more intensity sensors of touch screen 504 (or the touch-sensitive surface) can provide output data that represents the intensity of touches. The user interface of device 500 can respond to touches based on their intensity, meaning that touches of different intensities can invoke different user interface operations on device 500.

Exemplary techniques for detecting and processing touch intensity are found, for example, in related applications: International Patent Application Serial No. PCT/US2013/040061, titled "Device, Method, and Graphical User Interface for Displaying User Interface Objects Corresponding to an Application," filed May 8, 2013, published as WIPO Publication No. WO/2013/169849, and International Patent Application Serial No. PCT/US2013/069483, titled "Device, Method, and Graphical User Interface for Transitioning Between Touch Input to Display Output Relationships," filed Nov. 11, 2013, published as WIPO Publication No. WO/2014/105276, each of which is hereby incorporated by reference in their entirety.

In some embodiments, device 500 has one or more input mechanisms 506 and 508. Input mechanisms 506 and 508, if included, can be physical. Examples of physical input mechanisms include push buttons and rotatable mechanisms. In some embodiments, device 500 has one or more attachment mechanisms. Such attachment mechanisms, if included, can permit attachment of device 500 with, for example, hats, eyewear, earrings, necklaces, shirts, jackets, bracelets, watch straps, chains, trousers, belts, shoes, purses, backpacks, and so forth. These attachment mechanisms permit device 500 to be worn by a user.

Figure 5B:
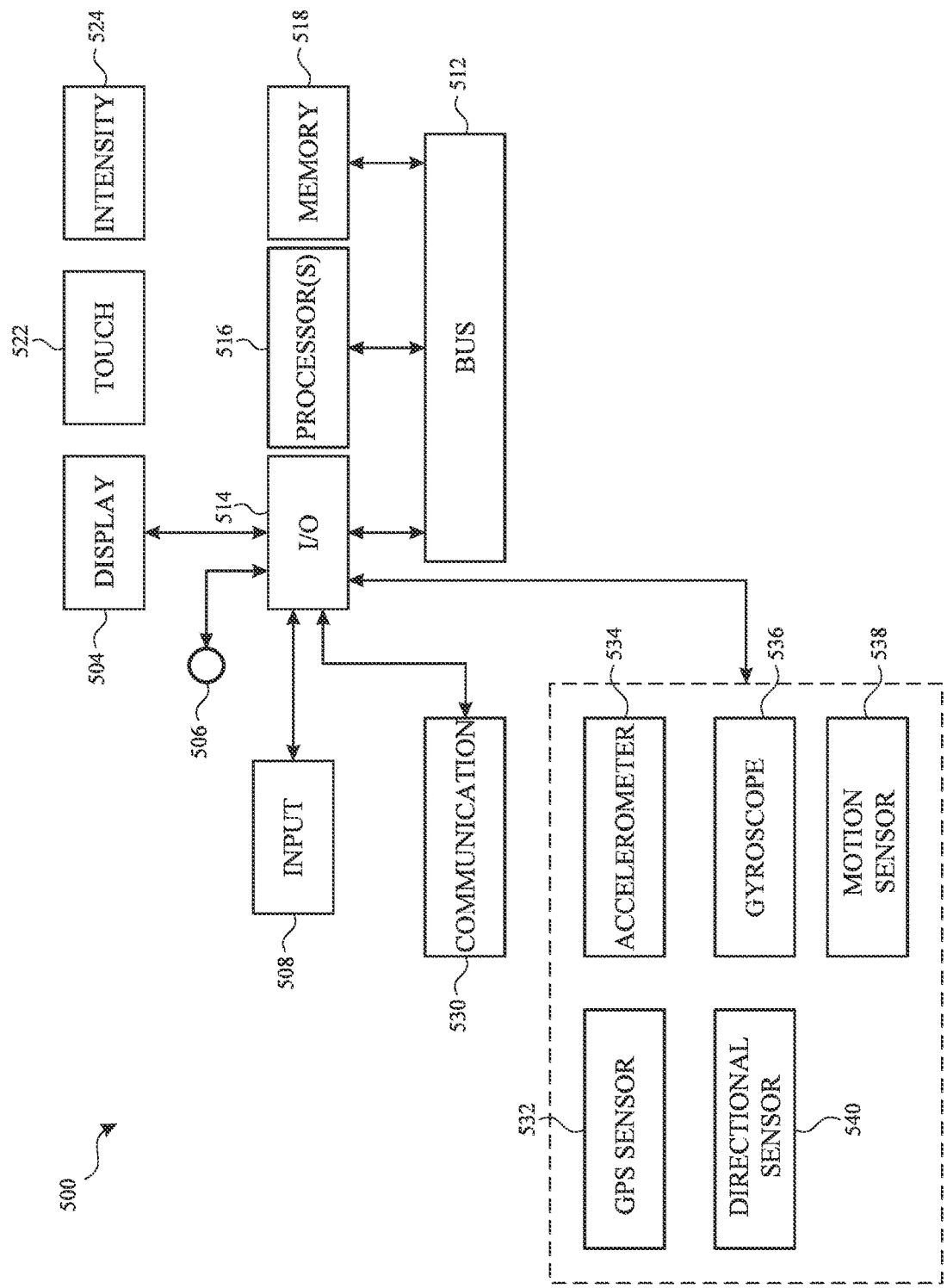
FIG. 5B is a block diagram illustrating a personal electronic device in accordance with some embodiments.

FIG. 5B depicts exemplary personal electronic device 500. In some embodiments, device 500 can include some or all of the components described with respect to FIGS. 1A, 1B, and 3. Device 500 has bus 512 that operatively couples I/O section 514 with one or more computer processors 516 and memory 518. I/O section 514 can be connected to display 504, which can have touch-sensitive component 522 and, optionally, intensity sensor 524 (e.g., contact intensity sensor). In addition, I/O section 514 can be connected with communication unit 530 for receiving application and operating system data, using Wi-Fi, Bluetooth, near field communication (NFC), cellular, and/or other wireless communication techniques. Device 500 can include input mechanisms 506 and/or 508. Input mechanism 506 is, optionally, a rotatable input device or a depressible and rotatable input device, for example. Input mechanism 508 is, optionally, a button, in some examples.

Input mechanism 508 is, optionally, a microphone, in some examples. Personal electronic device 500 optionally includes various sensors, such as GPS sensor 532, accelerometer 534, directional sensor 540 (e.g., compass), gyroscope 536, motion sensor 538, and/or a combination thereof, all of which can be operatively connected to I/O section 514.

Memory 518 of personal electronic device 500 can include one or more non-transitory computer-readable storage mediums, for storing computer-executable instructions, which, when executed by one or more computer processors 516, for example, can cause the computer processors to perform the techniques described below, including processes 1000 and 1100 (FIGS. 10A-10B and 11A-11C). A computer-readable storage medium can be any medium that can tangibly contain or store computer-executable instructions for use by or in connection with the instruction execution system, apparatus, or device. In some examples, the storage medium is a transitory computer-readable storage medium. In some examples, the storage medium is a non-transitory computer-readable storage medium. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like. Personal electronic device 500 is not limited to the components and configuration of FIG. 5B, but can include other or additional components in multiple configurations.

As used here, the term "affordance" refers to a user-interactive graphical user interface object that is, optionally, displayed on the display screen of devices 100, 300, and/or 500 (FIGS. 1A, 3, and 5A-5B). For example, an image (e.g., icon), a button, and text (e.g., hyperlink) each optionally constitute an affordance.

As used herein, the term "focus selector" refers to an input element that indicates a current part of a user interface with which a user is interacting. In some implementations that include a cursor or other location marker, the cursor acts as a "focus selector" so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider, or other user interface element), the particular user interface element is adjusted in accordance with the detected input. In some implementations that include a touch screen display (e.g., touch-sensitive display system 112 in FIG. 1A or touch screen 112 in FIG. 4A) that enables direct interaction with user interface elements on the touch screen display, a detected contact on the touch screen acts as a "focus selector" so that when an input (e.g., a press input by the contact) is detected on the touch screen display at a location of a particular user interface element (e.g., a button, window, slider, or other user interface element), the particular user interface element is adjusted in accordance with the detected input. In some implementations, focus is moved from one region of a user interface to another region of the user interface without corresponding movement of a cursor or movement of a contact on a touch screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally, based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds optionally includes a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second threshold results in a third operation. In some embodiments, a comparison between the characteristic intensity and one or more thresholds is used to determine whether or not to perform one or more operations (e.g., whether to perform a respective operation or forgo performing the respective operation), rather than being used to determine whether to perform a first operation or a second operation.

As used herein, an "installed application" refers to a software application that has been downloaded onto an electronic device (e.g., devices 100, 300, and/or 500) and is ready to be launched (e.g., become opened) on the device. In some embodiments, a downloaded application becomes an installed application by way of an installation program that extracts program portions from a downloaded package and integrates the extracted portions with the operating system of the computer system.

As used herein, the terms "open application" or "executing application" refer to a software application with retained state information (e.g., as part of device/global internal state 157 and/or application internal state 192). An open or executing application is, optionally, any one of the following types of applications:

- an active application, which is currently displayed on a display screen of the device that the application is being used on;
- a background application (or background processes), which is not currently displayed, but one or more processes for the application are being processed by one or more processors; and
- a suspended or hibernated application, which is not running, but has state information that is stored in memory (volatile and non-volatile, respectively) and that can be used to resume execution of the application.

As used herein, the term "closed application" refers to software applications without retained state information (e.g., state information for closed applications is not stored in a memory of the device). Accordingly, closing an application includes stopping and/or removing application processes for the application and removing state information for the application from the memory of the device. Generally, opening a second application while in a first application does not close the first application. When the second application is displayed and the first application ceases to be displayed, the first application becomes a background application.

Attention is now directed towards techniques for avatar animation. Such techniques are at least partially implemented on an electronic device, such as portable multifunction device 100, device 300, device 500, or device 604, discussed below.

Figure 6:
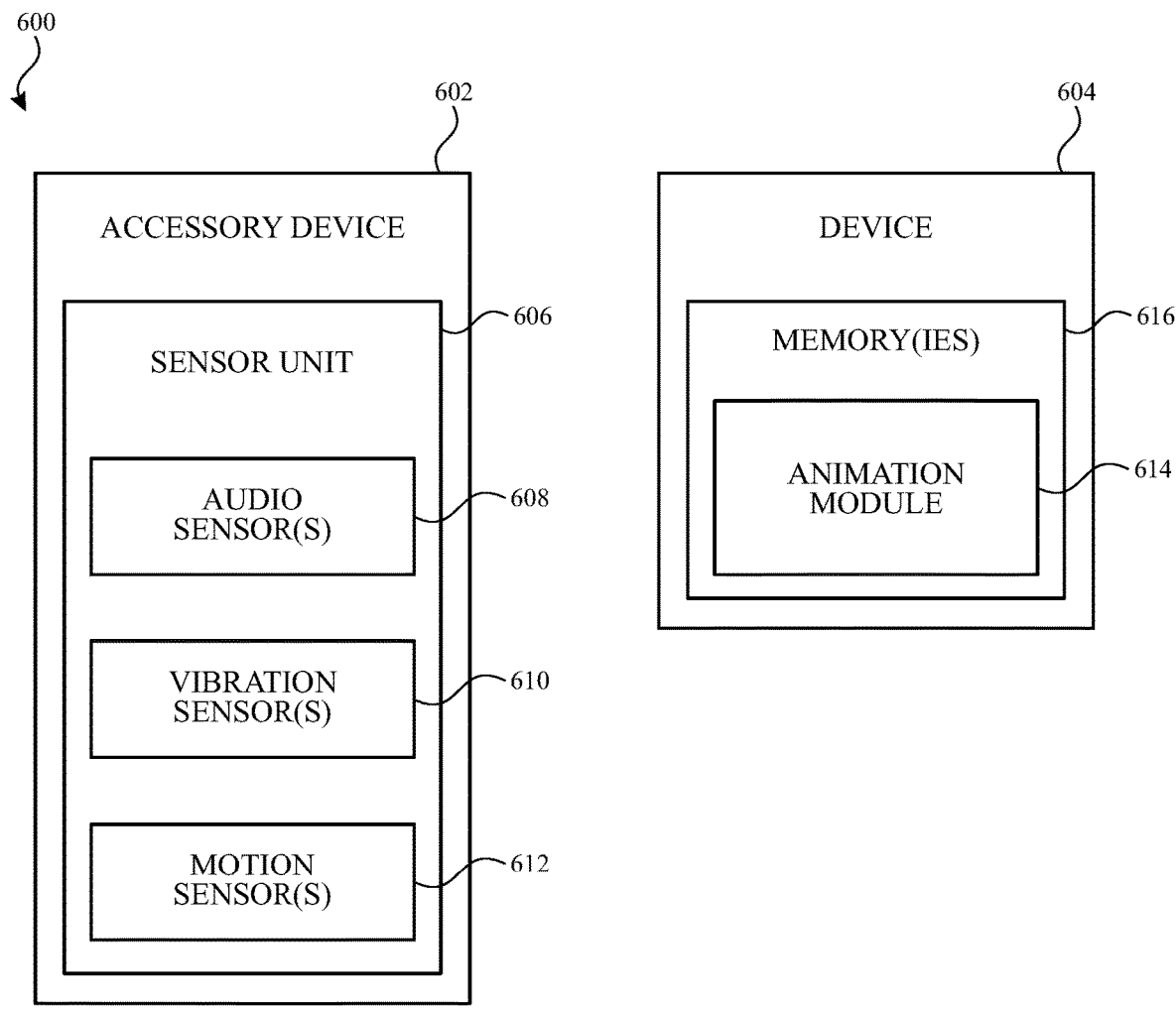
FIG. 6 illustrates a system for avatar animation, in accordance with some embodiments.

FIG. 6 illustrates system 600 for avatar animation, in accordance with some embodiments. The various components and functions of system 600 are implemented in hardware, software instructions for execution by one or more processors, firmware, including one or more signal processing and/or application specific integrated circuits, or a combination or sub-combination thereof. System 600 is only one embodiment of a system for avatar animation, and system 600 can have more or fewer components than shown, can combine two or more components, or can have a different configuration or arrangement of the components.

System 600 includes accessory device 602. In some embodiments, accessory device 602 implements at least some of the components and functionalities discussed above with respect to device 100, device 300, or device 500. In some embodiments, accessory device 602 is a peripheral device to device 604, is external to device 604, and/or has the same user as device 604. In various embodiments illustrated herein, accessory device 602 is a headset, e.g., a head mounted device, earbuds, headphones, or eyeglasses. In other embodiments, accessory device 602 is another type wearable device, such as a smart watch, a smart ring, a smart article of clothing, a digital health monitoring device, or the like. In other embodiments, accessory device 602 is another type of electronic device, e.g., a smartphone, a tablet device, a laptop computer, a desktop computer, a smart speaker, or a smart home appliance.

Accessory device 602 can be communicatively coupled, via a wired or wireless connection, to device 604. For example, accessory device 602 can be coupled to device 604 via any of the communication protocols discussed above with respect to RF circuitry 108, thereby enabling transmission of data detected by the various sensor(s) of accessory device 602 to device 604.

In some embodiments, accessory device 602 includes sensor unit 606. In some embodiments, sensor unit 606 includes audio sensor(s) 608 (e.g., microphone(s)), vibration sensor(s) 610 (e.g., bone conduction microphone(s)), motion sensor(s) 612 (e.g., gyroscope(s) and/or accelerometer(s)), or a sub-combination thereof. As described in detail below, device 604 processes data detected by the sensor(s) of sensor unit 606 to animate (e.g., render) an avatar associated with a user of device 604. In some embodiments, device 604 requires data from the sensor(s) of accessory device 602 to animate the avatar. In other embodiments, device 604 animates the avatar without using any other device, e.g., without using accessory device 602. For example, device 604 includes sensor unit 606 and animates the avatar by processing data detected by the locally implemented sensor(s) of sensor unit 606.

Notably, sensor unit 606 does not include any cameras (e.g., optical sensor(s) 164, depth camera sensor(s) 175). In some embodiments, while accessory device 602 and/or device 604 may each include camera(s), device 604 can animate an avatar associated with its user without using any camera or camera data, e.g., while camera(s) configured to capture video or images of the user are disabled (e.g., not detecting data). In other embodiments, device 602 (or device 604) does not include any cameras, or does not include any camera(s) of a particular type, e.g., RGB camera(s) configured to detect video and/or images in the visible light range. Accordingly, during a communication session (e.g., a video communication session), rather than transmitting live video of the user to the other participants in the communication session, device 604 can instead transmit an animated avatar representation of the user.

As used herein, "video of a user" or "image of a user" respectively describes video data or image data that directly represents the user's physical appearance. For instance, a "video of a user" and an "image of a user" include camera data (e.g., RGB camera data) directly portraying the user, e.g., videos or images of the user detected by optical sensor(s) 164. In contrast, an "avatar associated with a user" describes a computer-generated indirect representation of the user. The avatar may or may not accurately portray the user's physical appearance. For example, when creating the avatar, the user may choose whether a visual feature of the avatar (e.g., skin tone, mouth shape, eye shape, and the like) accurately corresponds to the respective physical feature of the user. As another example, the avatar may portray an animal or an inanimate object (e.g., a giraffe, an alien, a robot, a unicorn, etc.) having facial and/or bodily features different from those of a human user. While a device can create an avatar associated with a user using a video and/or an image of the user, it will be appreciated that the created avatar does not directly represent the user. Avatar 800 (FIGS. 8, 9B, 9C, 9F) depicts an avatar associated with a user, while live video 914 (FIGS. 9D, 9E) depicts video of the user. As described herein, representing a user as an animated avatar (rather than using video or images of the user) during communication sessions may advantageously reduce user fatigue, and additionally, improve device security and user privacy.

Device 604 implements at least some of the components and functionalities discussed above with respect to device 100, device 300, or device 500. In various embodiments illustrated herein, device 604 is a smart phone. However, device 604 may be implemented as any other type of electronic device, such as a laptop computer, a desktop computer, a tablet device, a television, a smart speaker, a smart home appliance, a wearable device (e.g., headset, smart watch, eyeglasses), and the like.

Device 604 includes animation module 614. In some embodiments, animation module 614 is implemented, at least partially, as computer-executable instructions stored in memory(ies) 616 of device 604. As discussed below with respect to FIG. 7, animation module 614 is configured to process data detected by the sensor(s) of sensor unit 606 to cause device 604 to animate an avatar associated with device 604's user.

Figure 7:
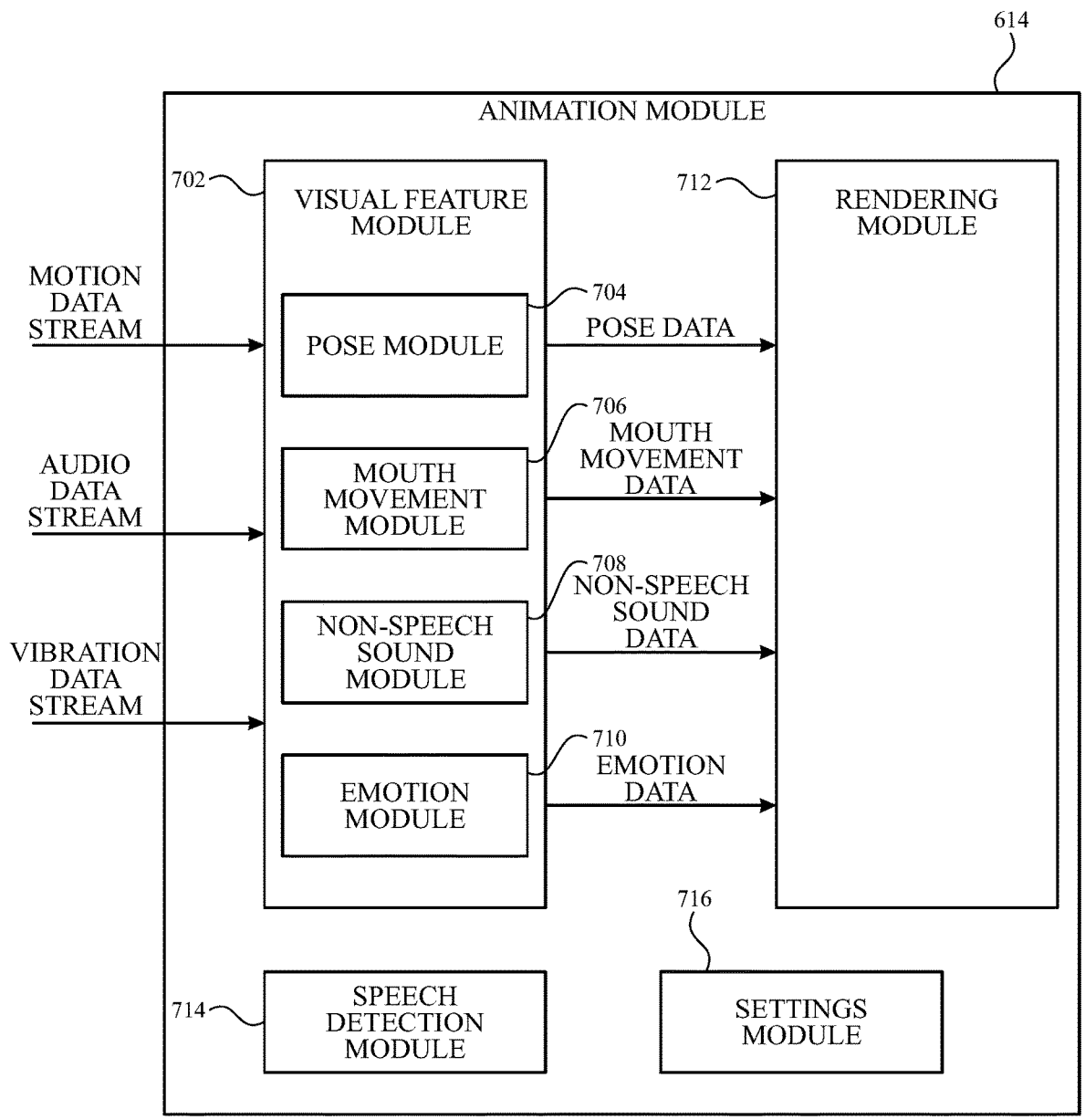
FIG. 7 illustrates an architecture of an animation module, in accordance with some embodiments.

FIG. 7 illustrates an architecture of animation module 614, in accordance with some embodiments. In some embodiments, the various modules of functions of animation module 614 described below are each implemented as software programs, e.g., as computer-executable instructions stored in memory(ies) 616 of device 604. Amination module 614 is only one embodiment of a module for avatar animation, and animation module 614 can have more or fewer components than shown, can combine two or more components, or can have a different configuration or arrangement of the components.

Animation module 614 includes visual feature module 702. Visual feature module 702 is configured to determine, based on data detected by the sensor(s) of sensor unit 606, one or more sets of data respectively representing different types of visual features of the avatar. Example types of visual features include a pose (e.g., position and orientation) of the avatar, an emotional state of the avatar, and types of facial features of the avatar. Example types of facial features include mouth movements and/or mouth features corresponding to user speech and facial movements and/or facial features corresponding to non-speech sounds, e.g., yawning, sneezing, coughing, laughing, crying, and the like. Such visual features of the avatar may correspond to respective visual features of the user of device 604. In particular, the sensor(s) of sensor unit 606 may detect data from which visual feature module 702 determines the user's pose, emotional state, and facial features (or sub-combination thereof). Accordingly, by animating the avatar according to the determined visual feature(s), the avatar provides a semi-realistic live depiction of the user, e.g., has the same head pose as the user, has mouth movement analogous to the user's mouth movement, and has facial features representing the user's emotional state.

In some embodiments, visual feature module 702 includes pose module 704. Pose module 704 is configured to receive a first data stream (motion data stream) detected by motion sensor(s) 612 and determine, based on the motion data stream, a first set of data (pose data) representing a pose of the avatar. In some embodiments, pose module 704 implements deterministic techniques known in the art for analyzing motion data (e.g., gyroscope and/or accelerometer data) to determine the user's (and thus avatar's) pose. In some embodiments, pose module 704 implements probabilistic (e.g., machine learned) techniques to determine the user's pose. For example, pose module 704 includes one or more neural networks trained to accept motion data as input and to output the pose data. In some embodiments, the pose data includes mathematical representations of the user's pose. For example, the pose data includes a sequence of transformation matrices or meshes representing the user's pose changes over time. In some embodiments, pose module 704 determines the pose data without processing any camera data, e.g., from a camera of accessory device 602 and/or device 604.

In some embodiments, the pose includes a head pose. For example, in embodiments where motion sensor(s) 612 are implemented on a headset, pose module 704 determines a head pose of the user based on motion data stream.

In some embodiments, the pose of the avatar includes a pose of another body part (e.g., hand, arm, chest, leg, and the like) of the user/avatar. For example, in embodiments where motion sensor(s) 612 are implemented on a smart watch, pose module 704 determines an arm and/or hand pose of the user based on the motion data stream. As another example, in embodiments where motion sensor(s) 612 are implemented in smart clothing (e.g., a smart shirt), pose module 704 determines a body (e.g., chest) pose of the user based on the motion data stream. Accordingly, in some embodiments, pose module 704 determines different types of poses (using respective different techniques) depending on the type of the device implementing motion sensor(s) 612. As one example, if pose module 704 determines that motion sensor(s) 612 of a headset detect the motion data stream, pose module 704 analyzes the motion data stream using techniques for determining a head pose, e.g., using a neural network trained to determine head pose based on motion data detected by a headset.

In some embodiments, pose module 704 receives multiple motion data stream(s) from respective multiple instances of motion sensor(s) 612 implemented on respective different types of devices (e.g., each instances of accessory device 602). In some embodiments, consistent with the above discussed techniques and based on the multiple data streams, pose module 704 determines multiple sets of pose data representing respective pose types corresponding to the respective devices. For example, if pose module 704 receives motion data from a headset, motion data from a smart watch, and motion data from a smart shirt, pose module 704 determines sets of data respectively representing the avatar's head pose, arm pose, and chest pose.

In some embodiments, visual feature module 702 includes mouth movement module 706. Mouth movement module 706 is configured to receive a second data stream (audio data stream) detected by audio sensor(s) 608 and determine, based on the audio data stream, a second set of data representing a first type of facial feature of the avatar. In some embodiments, the first type of facial feature includes mouth movement of the avatar, the mouth movement corresponding to user speech.

In some embodiments, while receiving the audio data stream, visual feature module 702 receives a third data stream (vibration data stream) detected by vibration sensor(s) 610. For example, while audio sensor(s) 608 detect speech, vibration sensor(s) 610 detect bone conduction data (e.g., skull vibrations) corresponding to the speech. In some embodiments, mouth movement module 706 further determines the second set of data (e.g., mouth movement data) based on the vibration data stream. In some embodiments, the mouth movement data includes mathematical representations of the avatar's mouth movement and position, e.g., a sequence of transformation matrices or meshes indicating how the avatar's mouth movement changes over time. In some embodiments, mouth movement module 706 determines the mouth movement data without processing any camera data, e.g., from a camera of accessory device 602 and/or device 604.

In some embodiments, mouth movement module 706 implements machine learning techniques to determine the mouth movement data. For example, mouth movement module 706 includes one or more neural networks trained to accept audio data and/or vibration data as input and to output the mouth movement data. In some embodiments, the neural network(s) are trained to analyze a sequence of phonemes detected in the audio data and/or vibration data and correlate each phoneme with a mouth movement and/or position of the avatar. In some embodiments, the neural network(s) are trained to accept textual data (determined from speech) as input and to output the mouth movement data. For example, the neural network(s) are trained to map morphemes, words, and/or phrases to corresponding mouth movements and/or positions. Accordingly, in some embodiments, visual feature module 702 is configured to perform automatic speech recognition (ASR) on audio data and/or vibration data to determine corresponding text, e.g., according to techniques known in the art. In such embodiments, mouth movement module 706 accepts, as input, a representation of the text.

In some embodiments, visual feature module 702 includes non-speech sound module 708. Non-speech sound module 708 is configured to receive the audio data stream and determine, based on the audio data stream, a third set of data representing a second type of facial feature of the avatar. In some embodiments, the second type of facial feature includes facial movement corresponding to non-speech sound. Examples of such facial movement include facial movements respectively corresponding to yawning, sneezing, laughing, coughing, crying, and the like.

In some embodiments, non-speech sound module 708 receives the motion data stream and/or the vibration data stream and further determines the third set of data (e.g., non-speech sound data) based on the motion and/or vibration data stream. In some embodiments, non-speech sound module 708 receives the motion and/or vibration data stream while receiving the audio data stream. For example, while audio sensor(s) 608 detect audio corresponding to the user making a non-speech sound (e.g., sneeze), motion sensor(s) 612 detect head movements corresponding to the non-speech sound and/or vibration sensor(s) 610 detect vibrations corresponding to the non-speech sound. In some embodiments, non-speech sound module 708 determines the non-speech sound data without processing any camera data, e.g., from a camera of accessory device 602 and/or device 604.

In some embodiments, non-speech sound module 708 implements machine learning techniques to determine the non-speech sound data. For example, non-speech sound module 708 includes one or more neural networks trained to accept audio data, vibration data, and motion data (or a sub-combination thereof) as input and to output the non-speech sound data. In some embodiments, the neural network(s) include a classification neural network configured to classify the input data as one of a plurality of predetermined non-speech sound types, e.g., yawning, coughing, sneezing, laughing, crying, sighing, and the like. Thus, in some embodiments, the non-speech sound data includes the classification result indicating the non-speech sound type. In some embodiments, the neural network(s) instead output mathematical representations of facial movement and/or position corresponding to the non-speech sound, e.g., a sequence of transformation matrices or meshes indicating how the avatar's face changes over time.

In some embodiments, visual feature module 702 includes emotion module 710. Emotion module 710 is configured to receive the audio data stream and determine, based on the audio data stream, a fourth set of data representing an emotional state of the user (emotion data). Example emotional states include angry, happy, sad, surprised, scared, disgusted, tired, nervous, relaxed, and the like. In some embodiments, an emotional state includes an emotional sub-state (e.g., mildly happy, very happy, normal happy). Accordingly, depending on the particular implementation of emotion module 710, the emotion data can represent an emotional state or an emotional sub-state.

In some embodiments, emotion module 710 receives the vibration data stream and further determines the emotion data based on the vibration data stream. In some embodiments, emotion module 710 receives the vibration data stream while receiving the audio data stream. In some embodiments, emotion module 710 determines the emotion data without processing any camera data, e.g., from a camera of accessory device 602 and/or device 604.

In some embodiments, emotion module 710 implements machine learning techniques to determine the emotion data. For example, emotion module 710 includes one or more neural networks trained to accept audio data and/or vibration data as input and to output the emotion data. In some embodiments, the neural network(s) are trained to map a user's audio features (e.g., pitch, tone, amplitude, rate, and the like) and/or vibration data (e.g., skull vibrations corresponding to smiling movements or frowning movements, laughing movements or crying movements, etc.) to an emotional state. In some embodiments, the neural network(s) accept textual data (determined from speech) as input and output the emotion data. For example, visual feature module 702 performs ASR on the audio data and/or vibration data to determine corresponding text, a representation of which the neural network(s) accept as input. In such embodiments, the neural network(s) are trained, for instance, to map words and/or phrases of the text to an emotional state.

In some embodiments, the neural network(s) of emotion module 710 include a classification neural network configured to classify the input(s) as one of a plurality of predetermined types of emotional states. Thus, in some embodiments, the emotion data includes the classification result indicating the emotional state. In some embodiments, the neural network(s) output emotion data including mathematical representations of facial features corresponding to the emotional state, e.g., a sequence of transformation matrices or meshes indicating how the avatar's face changes over time.

While the above describes pose module 704, mouth movement module 706, non-speech sound module 708, and emotion module 710 as separate components, in some embodiments, visual feature module 702 combines the functionalities of these modules into a single machine learned model. For example, visual feature module 702 includes a single multi-task neural network trained to accept motion data, audio data, and vibration data (and optionally a textual representation of the audio and/or vibration data) as input and to output a set of data representing each of the determinations of the aforementioned modules. In some embodiments, the set of data includes sequence(s) of transformation matrices or meshes representing the avatar's pose and facial features over time. Thus, when rendering module 712 (discussed below) renders the avatar using such data, the avatar's pose, mouth movement, facial features corresponding to non-speech sound, and facial features corresponding to emotional state are each analogous to the user's respective visual feature.

Animation module 614 includes rendering module 712. Rendering module 712 is configured to cause device 604 to render the avatar using the pose data, mouth movement data, non-speech sound data, and emotion data (or sub-combination thereof). For example, rendering module 712 updates a mathematical representation of the avatar using the above-described mathematical representations included the in data. For example, rendering module 712 applies (e.g., superimposes) each of the meshes (representing different visual features) to the avatar's mathematical representation. In embodiments where the data indicates a classification result (e.g., of non-speech sound type, of emotional state), rendering module 712 maps the classification result to a corresponding predetermined mathematical representation, e.g., a sequence of transformation matrices or meshes indicating facial features corresponding to the non-speech sound type or to the emotional state. Rendering module 712 then updates the avatar's mathematical representation using the predetermined mathematical representation, e.g., analogously to that described above.

In some embodiments, rendering module 712 causes device 604 to render the avatar according to the updated mathematical representation. Thus, by live updating (e.g., as sensor unit 606 detects new data) the avatar's mathematical representation based on updated data from visual feature module 702, rendering module 712 synchronizes the avatar's visual features with the user's determined visual features.

Figure 8:
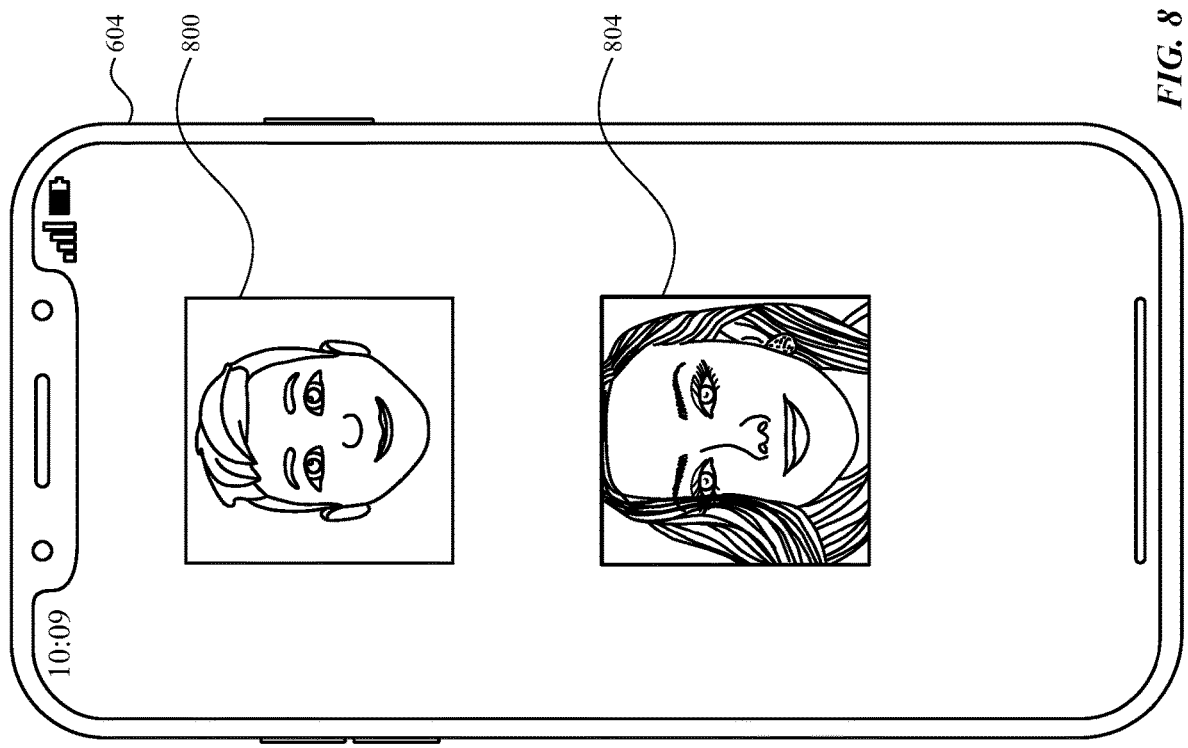
FIG. 8 illustrates rendering an avatar, in accordance with some embodiments.
Figure 8:
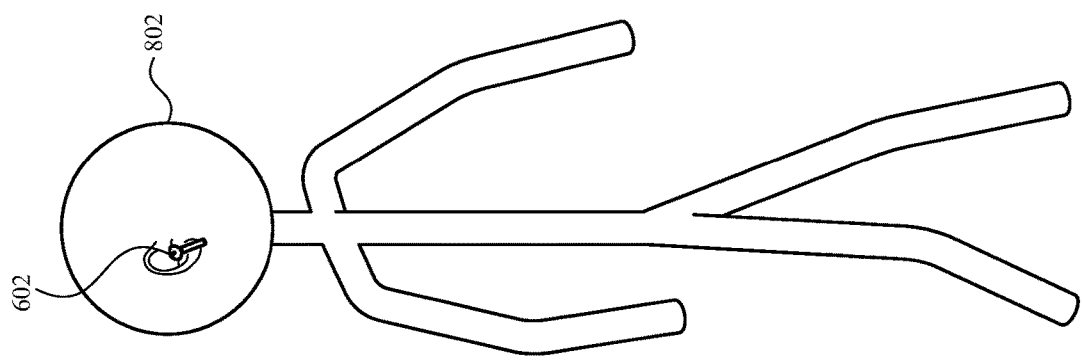

FIG. 8 illustrates rendering avatar 800, in accordance with some embodiments. In FIG. 8, avatar 800 is associated with user 802 of device 604. For example, user 802 previously provided input to device 604 to create avatar 800 to represent the user.

In FIG. 8, device 604 is engaged in a video communication session with an external electronic device (not shown). During the video communication session, device 604 renders avatar 800 by processing data detected by sensor(s) of accessory device 602 (e.g., earbuds), as described herein. Device 604 further displays representation 804 of another participant in the communication session, e.g., a user of the external electronic device. In the illustrated embodiment, representation 804 includes live video of the other participant, e.g., detected by a camera of the external electronic device. In other embodiments, representation 804 includes an animated avatar associated with the other participant, e.g., if the external electronic device renders the avatar according to the techniques discussed herein.

As shown in FIG. 8, rendering avatar 800 includes displaying, on a display of device 604, the rendered avatar 800. In some embodiments, rendering avatar 800 includes causing the external electronic device to display the rendered avatar 800. For example, device 604 transmits video data representing the rendered avatar 800 to the external electronic device (and to any other external electronic devices engaged in the communication session). In some embodiments, rendering avatar 800 is performed without processing any data from a camera. For example, the above-described process for rendering avatars does not require any camera data, thereby allowing users to have an animated presence during video communication sessions without activating any device camera. In FIG. 8, for instance, camera(s) of device 604 configured to capture video of user 802 (e.g., in the visible light range) are disabled.

In some embodiments, rendering avatar 800 includes synchronizing displayed mouth movement of avatar 800 with user speech included in the audio data stream. For example, as the audio data stream updates (e.g., as user 802 speaks), mouth movement module 706 updates the mouth movement data and rendering module 712 causes device 604 to update the rendered avatar accordingly. Accordingly, user 802 (and other participants in the video communication session) may perceive synchronization of avatar 800's mouth movement with user 802's speech, e.g., not notice significant delay between user 802's speech and avatar 800's corresponding mouth movement. It will be appreciated rendering module 712 can synchronize user 802's and avatar 800's pose and other facial features (e.g., corresponding to an emotional state or to non-speech sound) in an analogous manner.

Returning to FIG. 7, in some embodiments, animation module 614 includes speech detection module 714. Speech detection module 714 is configured determine, based on the vibration data stream, whether user 802 is speaking. In some embodiments, determining whether user 802 is speaking includes determining whether user 802 is making sounds, e.g., sneezing, coughing, yawning, and the like.

In some embodiments, animation module 614 receives the vibration data stream while receiving the audio data stream. For example, the vibration data stream corresponds to skull bone vibrations caused by user speech or sounds. In some embodiments, speech detection module 714 further determines whether user 802 is speaking based on the audio data stream. For example, speech detection module 714 processes the vibration data stream and/or audio data stream according to voice activity detection (VAD) techniques known in the art to determine whether user 802 is speaking. Further techniques for determining whether a user is speaking based on vibration and/or audio data are described in U.S. patent application Ser. No. 16/544,543, entitled "SPOKEN NOTIFICATIONS," filed on Aug. 19, 2019, the content of which is hereby incorporated by reference in its entirety.

Determining whether user 802 is speaking may distinguish user 802's speech and sounds from background noise and speech. For example, if the audio data stream indicates user 802's speech or sound, but the vibration data stream does not, speech detection module 714 determines that user 802 is not speaking or making sound. Specifically, user 802's speech or sounds may cause both the audio data stream and the vibration data stream to indicate speech or sound, e.g., by causing detectable vibrations of user 802's skull bones (e.g., of a certain degree and/or type). Accordingly, if the audio data stream indicates user speech or sound, but the vibration data stream does not, the audio may be background speech or noise.

In some embodiments, in accordance with a determination that user 802 is not speaking, device 604 forgoes rendering avatar 800 based on any visual features determined based on the audio data stream and/or vibration data stream. This may prevent device 604 from incorrectly rendering avatar 800 with visual features that do not correspond to user 802's speech or sound. For example, in accordance with speech detection module 714 determining that user 802 is not speaking, device 604 renders avatar 800 using the pose data, but without using the mouth movement data, the non-speech movement data, and/or the emotion data (data determined based on the audio data stream). This can prevent, for instance, incorrectly rendering avatar 800's mouth movement and/or emotional state consistent with background speech that does not correspond to user 802's mouth movement and/or emotional state. In some embodiments, device 604 renders avatar 800 using the mouth movement data, the non-speech sound data, and/or the emotion data (in addition to using the pose data) in accordance with speech detection module 714 determining that user 802 is speaking.

In some embodiments, in accordance with a determination that user 802 is not speaking, speech detection module 714 prevents visual feature module 702 from determining data (e.g., using modules 706, 708, and/or 710) based on the audio data stream and/or vibration data stream (or causes visual feature module 702 to cease determining the data). Accordingly, device 604's battery and processing power can be conserved by forgoing determining data that inaccurately represents user 802's visual features.

In some embodiments, rendering module 712 prevents device 604 from rendering certain types of visual features of avatar 800. In some embodiments, rendering module 712 predetermines such types of visual features. An example of such type of visual feature includes a predetermined type of pose of avatar 800. For example, rendering module 712 determines whether the pose data represents the predetermined type of pose, e.g., a pose corresponding to user 802/avatar 800 looking down at the floor, or any other pose other participant(s) in a communication session may perceive as rude or inattentive. In accordance with a determination that the pose data represents the predetermined type of pose, rendering module 712 causes device 604 to render avatar 800 in a modified manner using the pose data, e.g., such that rendered avatar 800 does not have the predetermined type of pose. For example, rendering module 712 modifies the pose data (e.g., one or more meshes) to not represent the predetermined type of pose and device 604 renders avatar 800 using the modified pose data. In some embodiments, in accordance with a determination that the pose data does not represent the predetermined type of pose, rendering module 712 causes device 604 to render avatar 800 in a non-modified manner, e.g., using unmodified pose data. Other examples of such type of visual features include visual features corresponding to predetermined types of emotional states (e.g., angry and scared) and visual features corresponding to predetermined types of non-speech sounds (e.g., yawning and crying). In some embodiments, rendering module 712 prevents device 604 from rendering such types of visual features in a manner analogous to that described above. For example, rendering module 712 causes device 604 to render avatar in 800 a non-modified manner using the non-speech sound data (or using the emotion data) in accordance with a determination that the non-speech sound data (or the emotion data) does not represent such type of visual feature.

In some embodiments, animation module 614 includes settings module 716. As described below, settings module 716 stores user-configurable settings of device 604 that control whether and how device 604 renders avatar 800.

In some embodiments, one or more settings stored in settings module 716 specify the types of visual features to not render. For example, one or more respective settings specify to not render avatar 800 with certain types of poses, with facial features representing certain emotional states, and/or with facial features representing certain non-speech sounds. Rendering module 712 can thus prevent device 604 from rendering avatar 800 with such visual features, e.g., in a manner analogous to that described above.

In some embodiments, a setting of device 604 corresponds to animating facial features of avatar 800. In some embodiments device 604 renders avatar 800 with determined facial features (e.g., using the mouth movement data, the non-speech sound data, and/or the emotion data) and using the pose data in accordance with a determination that the setting is enabled. In some embodiments, in accordance with a determination that the setting is not enabled, device 604 renders avatar 800 using the pose data and without using the mouth movement data, the non-speech sound data, and/or the emotion data. In some embodiments, separate settings of device 604 control whether to render avatar 800 respectively using the pose data, the mouth movement data, the non-speech sound data, and the emotion data. It will be appreciated that such settings may improve user privacy by enabling user control over what visual features of avatar 800 device 604 transmits to other devices.

Disabling the setting of device 604 corresponding to animating facial features of avatar 800 may be analogous to a type of muting command during a communication session. For example, if user 802 disables the setting during the communication session, rendered avatar 800 appears to user 802 (and to other participant(s) in the communication session) without facial features determined based on audio data and/or vibration data, e.g., mouth movement, non-speech sound facial features, and/or emotional state facial features. In some embodiments, even if the setting is disabled, device 604 may still transmit audio data (e.g., user 802's speech) to the other participant(s) in the communication session. In some embodiments, another type of muting command prevents device 604 from transmitting audio data to other participant(s) in the communication session, like the conventional muting command in video or telephone communication sessions. In some embodiments, if user 802 issues such type of muting command, device 604 still renders avatar 800 with facial features determined using the audio and/or vibration data (and transmits video of rendered avatar 800 to the other participants), but does not transmit the audio data to the other participants.

In some embodiments, rendering avatar 800 includes rendering the pose of the avatar 800 relative to a default pose of avatar 800. In some embodiments, one or more settings of settings module 716 specify whether to render the pose in a relative manner (e.g., relative to a default pose) or in an absolute manner. For example, if a setting specifies to render the pose in a relative manner, rendering module 712 determines, based on the pose data, whether the pose deviates from a default pose (e.g., a front-facing pose) by a predetermined amount (e.g., a predetermined angular deviation), and optionally, for a predetermined duration. If the pose deviates from the default pose by the predetermined amount (and optionally for the predetermined duration), rendering module 712 causes device 604 to render avatar 800 to have the default pose, e.g., by modifying the pose data to represent the default pose. Thereafter, rendering module 712 causes device 604 to render avatar 800's/user 802's pose changes relative to the default pose, e.g., by modifying the pose data to represent change from the default pose. In this manner, if user 802's pose significantly deviates from a front-facing pose (e.g., user 802 looks downwards at the floor), device 604 renders avatar 800 with the front-facing pose. For any subsequent pose changes (e.g., user 802's head shakes and nods while looking downward), device 604 renders avatar 800 with such pose changes relative to the front-facing pose (e.g., so front-facing avatar 800 has corresponding head shakes and nods). In some embodiments, if a setting specifies to render the pose in an absolute manner, device 604 forgoes performing the above discussed techniques, e.g., renders avatar 800 using unmodified pose data.

FIGS. 9A-9G illustrate various user interfaces associated with rendering avatar 800, in accordance with some embodiments.

FIGS. 9A-9F illustrate an embodiment where device 604 is engaged in a communication session with one or more external devices. In some embodiments, the communication session corresponds a textual communication session (e.g., a text or instant messaging session), an audio communication session (e.g., a telephone call), a video communication session (e.g., a video conference), or a virtual or mixed reality communication session. In a virtual or mixed reality communication session, the respective devices of the participants each provide an audiovisual experience to simulate each participant (or their respective avatar) being concurrently present in a shared location. In some embodiments, the communication session includes different types of communication experiences (e.g., audio, video, textual, virtual or mixed reality) provided by the respective devices of the participants. For example, in the communication session, a first device may provide a virtual or mixed reality communication experience (e.g., by displaying virtual representation(s) of other participant(s) in a virtual setting) while a second device may provide a video communication experience (e.g., by displaying video of the other participant(s)). Accordingly, the communication session may be provided by multiple devices having different capabilities, e.g., by a device having virtual reality capability and a device having limited or no virtual reality capability, by a device having video capability and a device having no video capability.

In some embodiments, an application installed on device 604 is configured to provide the communication session. Examples of applications configured to provide communication sessions include FaceTime by Apple Inc., Zoom Meetings by Zoom Video Communications, Inc., Skype by Skype Technologies S.A.R.L, Spatial by Spatial Systems Inc., a messaging application installed on device 604, a phone application installed on device 604, and the like. In FIG. 9A, during the communication session, device 604 displays user interface 900 of the application (e.g., a video communication application), discussed in detail below.

In some embodiments, one or more cameras associated with device 604 (e.g., internal camera(s) of device 604, external camera(s) coupled to device 604) are accessible by the application. For example an application authorized to access the camera(s) can at least one of: display data (e.g., live data, stored data) detected by the camera(s) in the application's user interface, process and/or modify the data, and transmit the data to external devices and/or services. While authorizing an application to access the camera(s) can be desirable for the application to support a communication session (e.g., transmit video/images of user 802), such authorization may raise privacy and device security concerns. Accordingly, in some embodiments, one or more settings of settings module 716 enable user 802 to prohibit an application from accessing any camera associated with device 604 and to authorize the application to access a rendering of avatar 800. For example, a first setting controls whether the application is authorized to access the camera(s) and a second setting controls whether the application authorized to access the rendering of avatar 800. In some embodiments, the setting(s) correspond to security and/or privacy settings of device 604. Thus, user 802 can have, via avatar 800, a live on-screen presence during communication sessions supported by the application while user privacy and device security are maintained.

In FIG. 9A, when user 802 joins the communication session, user interface 900 initially displays a static representation 908 of user 802. In some embodiments, displaying a representation of user 802 includes causing the external device(s) of the communication session to display the representation. In some embodiments, static representation 908 includes an image of user 802 and/or text representing user 802. In FIG. 9A, user interface 900 further displays representation 910 of another participant of the communication session, e.g., as image, text, video, or an animated avatar.

In some embodiments, device 604 receives, from user 802, an input (avatar rendering input) corresponding to a request to render, without using a camera, and during the communication session, avatar 800. In some embodiments, as shown in FIG. 9A, the avatar rendering input includes input 906 (e.g., a touch input, a gaze based input, an air gesture input, a speech input, a peripheral device input, and the like) corresponding to a selection of avatar rendering affordance 904 displayed in user interface 900. In some embodiments, user interface 900 includes avatar rendering affordance 904 if the corresponding application is authorized to access the rendering of avatar 800. As described below, after receiving input 906, device 604 can display a rendering of avatar 800 during the communication session.

In some embodiments, in accordance with receiving input 906, device 604 determines whether avatar 800 is being rendered (according to the techniques discussed herein) when input 906 is received. In accordance with a determination that avatar 800 is being rendered when input 906 is received, device 604 ceases to render avatar 800. For example, device 604 replaces the displayed rendering of avatar 800 with a display of static representation 908 or a display of video of user 802.

In some embodiments, in accordance with receiving avatar rendering input 906 (and optionally in accordance with a determination that device 604 is not rendering avatar 800 when input 906 is received), device 604 determines whether it is coupled to accessory device 602. For example, if accessory device 602 implements sensor unit 606, device 604 requires data from the sensor(s) to render avatar 800. In some embodiments, in accordance with a determination that device 604 is not coupled to accessory device 602, device 604 provides an output (e.g., displayed output, audio output) requesting to couple accessory device 602 to device 604, e.g., "please connect a headset to your device." It will be appreciated that in some embodiments, determining whether device 604 is coupled to accessory device 602 is not required, e.g., if device 604 implements sensor unit 606.

Figure 9B:
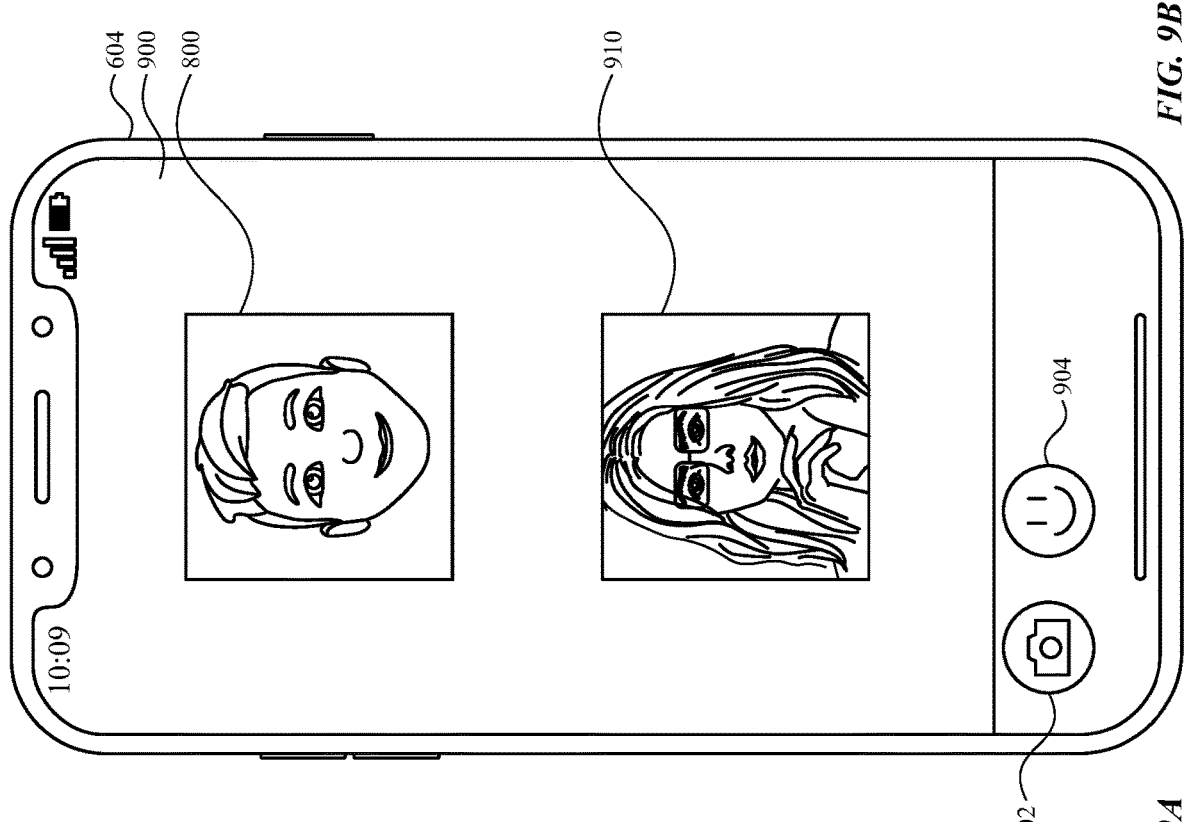
Figure 9A:
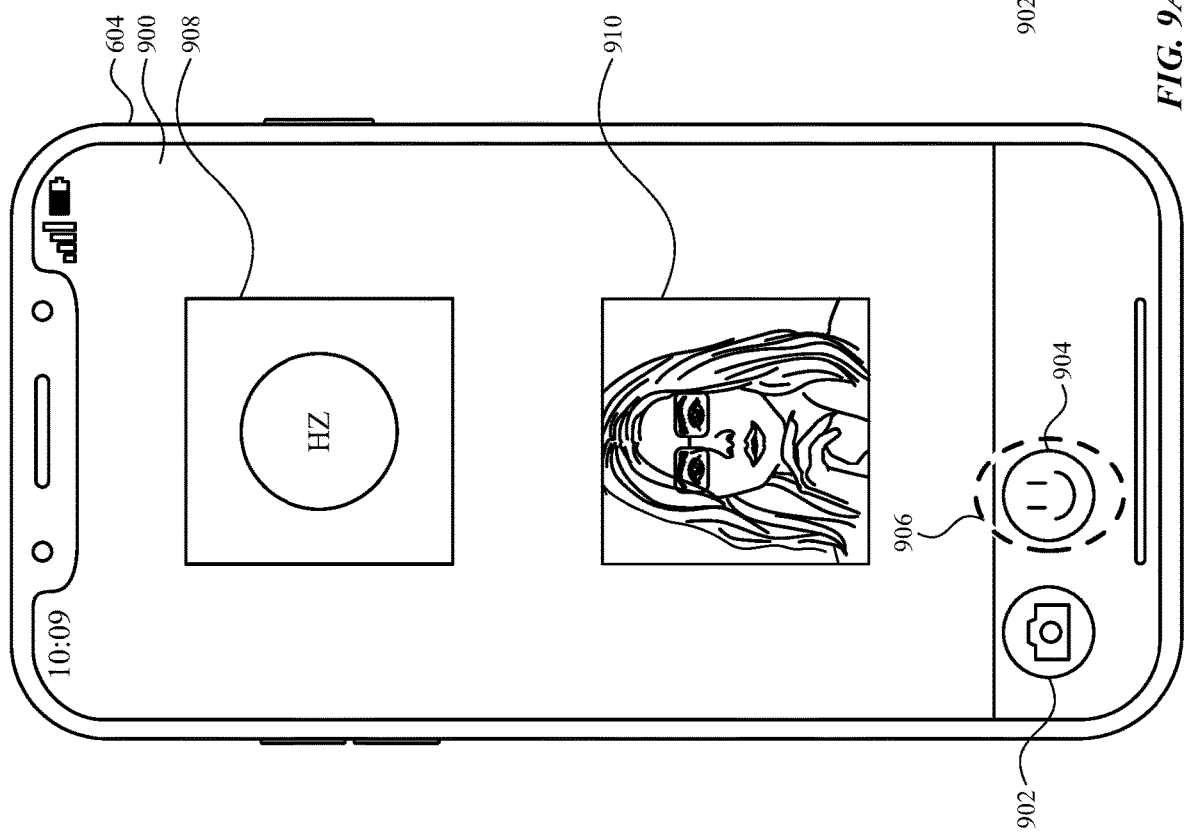

Turning to FIG. 9B, in accordance with a determination that device 604 is coupled to accessory device 602, during the communication session with the external electronic device(s), and while a camera corresponding to the communication session are disabled, device 604 renders avatar 800 according to the techniques discussed herein. For example, during the communication session and while the camera is disabled: device 604 receives, from accessory device 602, data stream(s) detected by respective type(s) of sensor(s) of accessory device 602, determines, based on the data stream(s), set(s) of data (e.g., pose data, mouth movement data, non-speech sound data, emotion data) respectively representing different type(s) of visual features of avatar 800, and renders avatar 800 using the set(s) of data. In some embodiments, during the communication session, device 604 further transmits video data representing rendered avatar 800 to the external electronic device(s) engaged in the communication session.

In some embodiments, a camera corresponding to the communication session is configured to transmit image or video data to one or more participants of the communication session. In some embodiments, a camera corresponding to the communication session is accessible by the application configured to provide the communication session.

In some embodiments, device 604 performs above-described technique for rendering avatar 800 (e.g., receiving data stream(s), determining set(s) of data, and rendering avatar 800 using the set(s) of data) while each camera corresponding to the communication session is disabled (e.g., not detecting data). For example, if both front-facing camera(s) and rear-facing camera(s) of device 604 correspond to the communication session, device 604 renders avatar 800 while both the front-facing and rear-facing camera(s) are disabled. As another example, if both an internal camera of device 604 and an external camera (e.g., external webcam) correspond to the communication session, device 604 renders avatar 800 while both the internal and external cameras are disabled. In some embodiments, device 604 includes camera(s) of a predetermined type (e.g., RGB cameras) and device 604 performs the above-described technique for rendering avatar 800 while each of the camera(s) of the predetermined type is disabled. Accordingly, in some embodiments, other types of camera(s) of device 604 (e.g., infrared camera(s)) may remain active (e.g., detect data) while rendering avatar 800 according to the above-described technique. In some embodiments, device 604 performs the above-described technique for rendering avatar while all cameras associated with device 604 (e.g., internal cameras, external cameras coupled to device 604) are disabled. Accordingly, FIG. 9B shows that during a video communication session, user 802 can have a live animated presence via avatar 800 without activating any camera.

Turning to FIG. 9C, in some embodiments, user interface 900 includes camera affordance 902. In some embodiments, user interface 900 includes camera affordance 902 if the corresponding application is authorized to access a camera associated with device 604. In FIG. 9C, device 604 receives input 912 corresponding to a selection of camera affordance 902. In some embodiments, in accordance with receiving input 912, device 604 determines whether device 604 is displaying live video (e.g., of user 802) detected by a camera when input 912 is received. In accordance with a determination that device 604 is displaying live video detected by a camera when input 912 is received, device 604 ceases to display the live video. For example, device 604 disables the corresponding camera(s) and replaces a displayed video representation of user 802 with a display of static representation 908 or a displayed rendering of avatar 800.

Turning to FIG. 9D, in accordance with a determination that device 604 is not displaying live video when input 912 is received, device 604 replaces the displayed rendering of avatar 800 with a display of live video 914, e.g., of user 802. For example, device 604 activates camera(s) corresponding to the communication session and transmits video data detected by the camera(s) to other participant(s) in the communication session.

Turning to FIG. 9E, device 604 receives input 916 corresponding to a selection of avatar rendering affordance 904. In some embodiments, in response to receiving input 916, device 604 disables camera(s) accessible by the application configured to provide the communication session. In some embodiments, in accordance with receiving input 916 and a determination that device 604 is not rendering avatar 800 when input 916 is received, device 604 replaces a previously displayed representation of user 802 (e.g., live video 914) with a rendering of avatar 800. For example, in FIG. 9F, responsive to receiving input 916, device 604 disables the camera(s) and replaces live video 914 with a displayed rendering of avatar 800. In this manner, user 802 can use affordances 902 and 904 to switch between different representations (e.g., live video representation, live avatar representation) of themselves during a communication session.

Figure 9G:
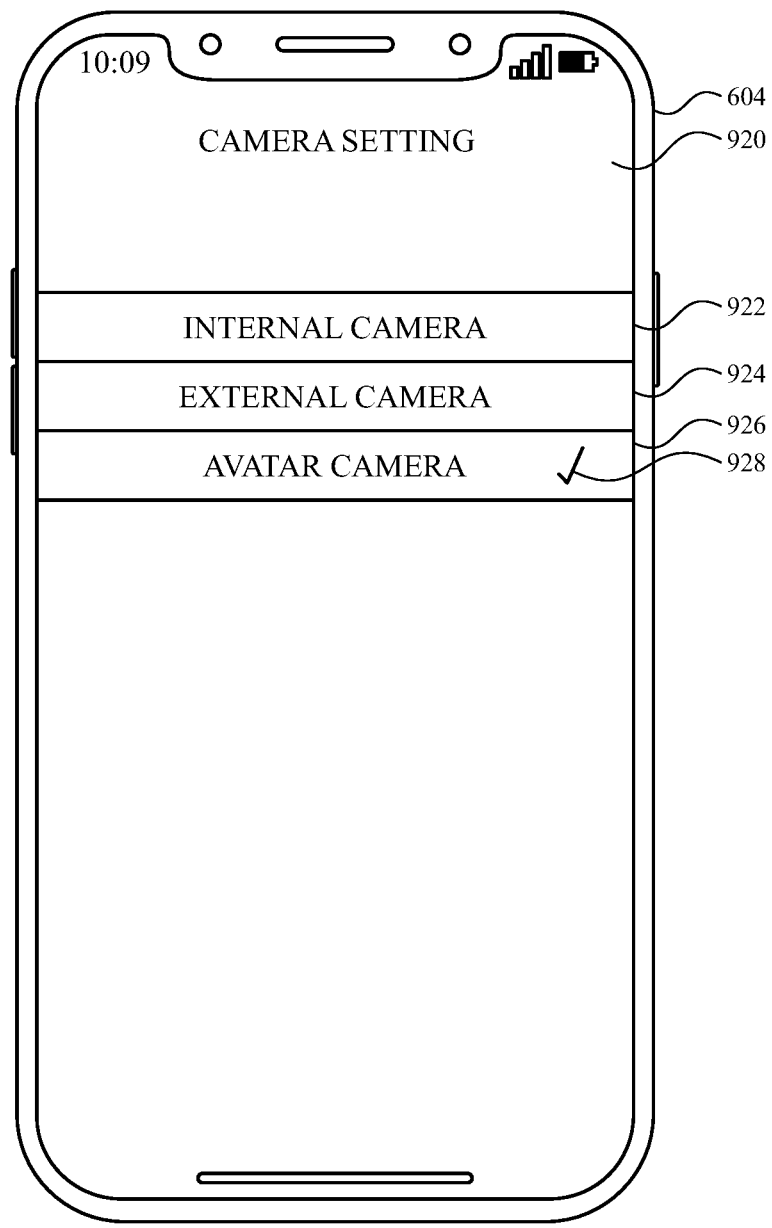

The embodiments of FIGS. 9A-9F show that avatar rendering input (e.g., inputs 906 and 916) corresponds to a selection of affordance 904 displayed in user interface 900. In other embodiments, the avatar rendering input corresponds to a selection of a camera setting of device 604, e.g., stored in settings module 716. For example, FIG. 9G shows a displayed user interface 920 for controlling camera settings of electronic device 604. User interface 920 allows user 802 to select which camera(s) device 604 should use to detect and/or transmit data. For example, user interface 920 includes internal camera affordance 922 (to select an internal camera of device 604), external camera affordance 924 (to select an external camera coupled to device 604), and avatar rendering affordance 926. Avatar rendering input corresponding to selection of affordance 926 enables (or disables) rendering of avatar 800, e.g., causes device 604 to use data detected by sensor unit 606 to render avatar 800 and/or to transmit the rendered avatar 800 to other device(s) (or prevents device 604 from doing so). In FIG. 9G, affordance 926 is selected (e.g., avatar rendering is enabled), as indicated by displayed selection glyph 928. In this manner, accessory device 602 can serve as a "camera" associated with device 604, e.g., as accessory device 602 detects data usable to render avatar 800.

In some embodiments, the camera setting is a global setting of device 604, e.g., is common to some or all applications installed on device 604. For example, if rendering of avatar 800 is enabled (e.g., via selection of affordance 926), rather than accessing data from camera(s)

associated with device 604, an application of device 604 authorized to access the camera(s) instead accesses the rendering of avatar 800 (e.g., as a video data stream). The application then processes and/or transmits the rendering of avatar 800 in the same manner as the application would process and/or transmit a video data stream. For example, if the rendering of avatar 800 is enabled via the device camera setting, user interface 900 (FIGS. 9A-9F) includes camera affordance 902, but does not include avatar rendering affordance 904. Camera affordance 902 thus functions analogously to avatar rendering affordance 904, as described above. For example, selection of camera affordance 902 when device 604 does not display the rendering of avatar 800 causes device 604 to display the rendering (and vice versa).

Figure 10A:
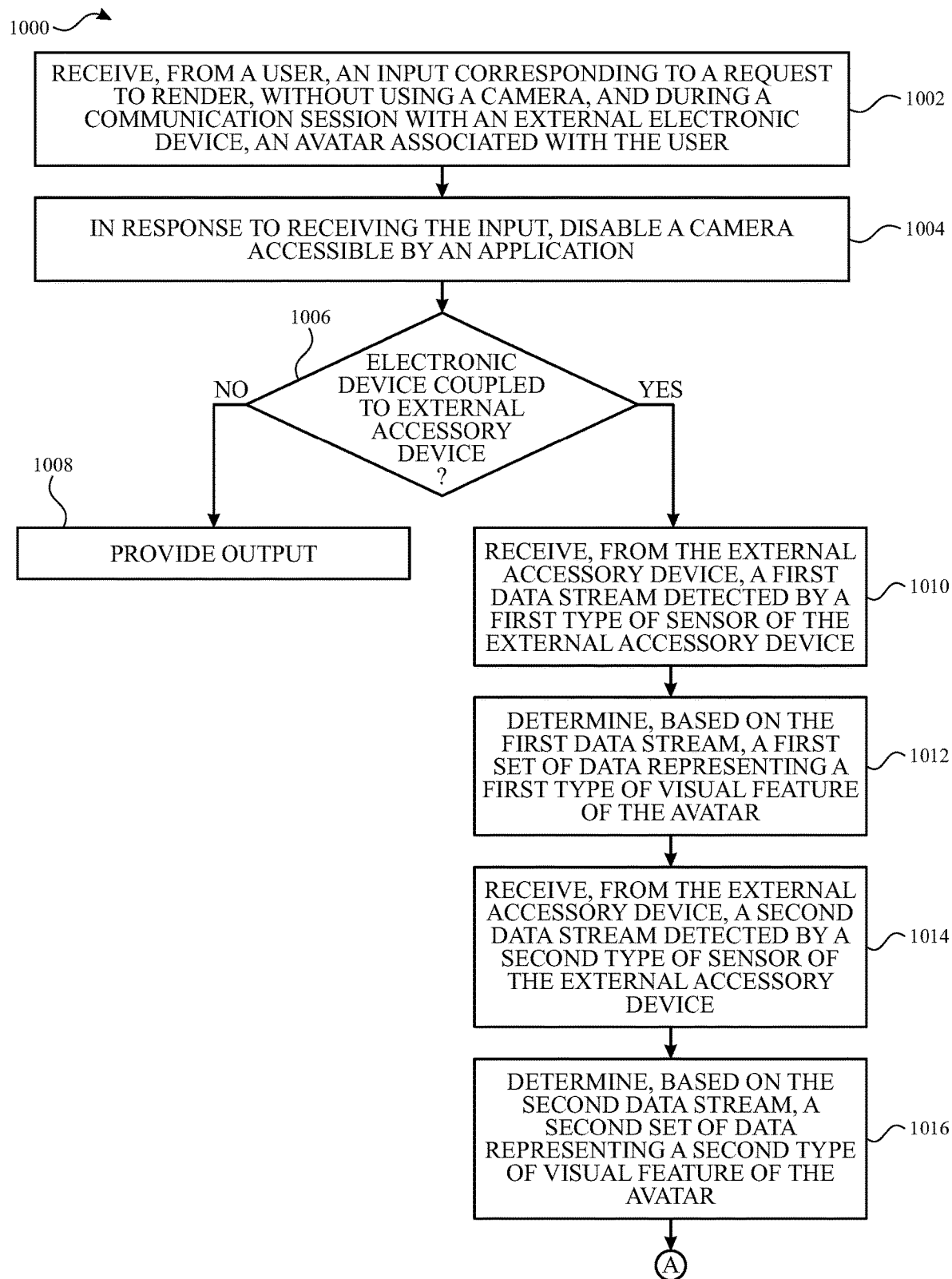
FIGS. 10A-10B is a flow diagram illustrating a process for avatar animation.
Figure 10B:
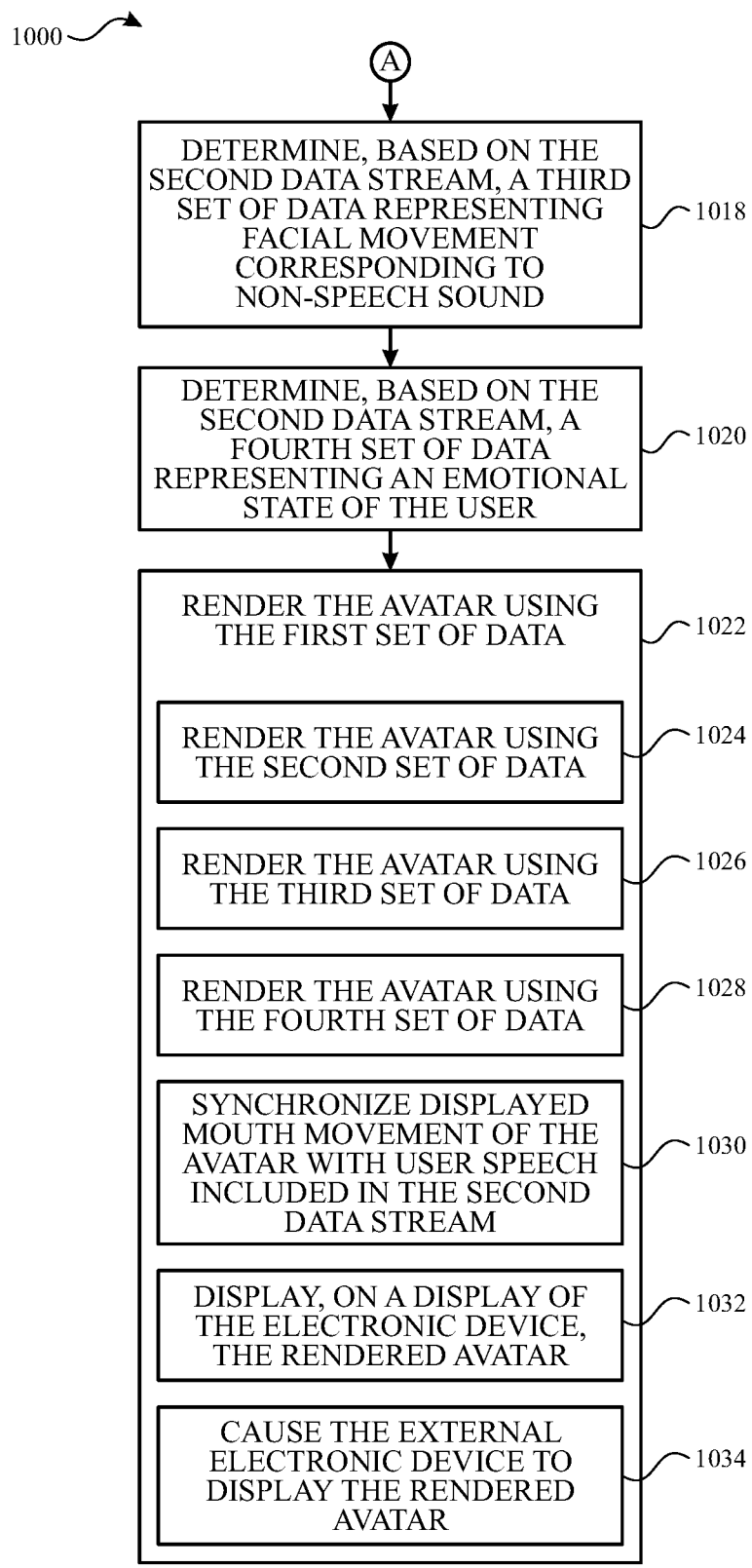

FIGS. 10A-10B is a flow diagram illustrating process 1000 for avatar animation. Process 1000 is performed at an electronic device (e.g., device 100, 300, 500, 604) with one or more processors and memory. Some operations in process 1000 are, optionally, combined, the orders of some operations are, optionally, changed, and some operations are, optionally, omitted.

In some embodiments, the electronic device (e.g., device 604) is a computer system. The computer system is optionally in communication (e.g., wired communication, wireless communication) with a display generation component and with one or more input devices. The display generation component is configured to provide visual output, such as display via a CRT display, display via an LED display, or display via image projection. In some embodiments, the display generation component is integrated with the computer system. In some embodiments, the display generation component is separate from the computer system. The one or more input devices are configured to receive input, such as a touch-sensitive surface receiving user input. In some embodiments, the one or more input devices are integrated with the computer system. In some embodiments, the one or more input devices are separate from the computer system. Thus, the computer system can transmit, via a wired or wireless connection, data (e.g., image data or video data) to an integrated or external display generation component to visually produce the content (e.g., using a display device) and can receive, a wired or wireless connection, input from the one or more input devices.

At block 1002, an input (e.g., avatar rendering input 906 or 916) corresponding to a request to render, without using a camera, and during a communication session with an external electronic device, an avatar (e.g., avatar 800) associated with the user (e.g., user 802) is received from the user. In some embodiments, the input corresponds to a selection of a camera setting of the electronic device (e.g., as shown in FIG. 9G). In some embodiments, the input corresponds to a selection of an affordance (e.g., avatar rendering affordance 904) displayed in a user interface (e.g., user interface 900) of a second application configured to provide the communication session. In some embodiments, the communication session corresponds to at least one of: a textual communication session; an audio communication session; a video communication session; and a virtual or mixed reality communication session.

At block 1004, in some embodiments, in response to receiving the input corresponding to the selection of the affordance, a camera accessible by the second application is disabled.

At block 1006, in accordance with receiving the input, it is determined whether the electronic device is coupled to an external accessory device (e.g., accessory device 602). At block 1008, in some embodiments, in accordance with a determination that the electronic device is not coupled to the external accessory device, an output (e.g., indicative of a request to couple the electronic device to the external accessory device) is provided. In some embodiments, the external accessory device includes a headset. In some embodiments, the external accessory device does not include a camera.

At block 1010, in accordance with receiving the input, and in accordance with a determination that the electronic device is coupled to the external accessory device, a first data stream detected by a first type of sensor of the external accessory device is received from the external accessory device (e.g., by visual feature module 702). At block 1012, is it determined (e.g., by pose module 704), based on the first data stream, a first set of data representing a first type of visual feature of the avatar. In some embodiments, the first type of sensor includes a motion sensor (e.g., motion sensor(s) 612) and the first type of visual feature includes a pose of the avatar.

At block 1014, in some embodiments, in accordance with receiving the input, and in accordance with a determination that the electronic device is coupled to the external accessory device, a second data stream detected by a second type of sensor of the external accessory device is received from the external accessory device (e.g., by visual feature module 702). At block 1016, in some embodiments, it is determined (e.g., by mouth movement module 706), based on the second data stream, a second set of data representing a second type of visual feature of the avatar. In some embodiments, the second type of sensor includes an audio sensor (e.g., audio sensor(s) 608) and the second type of visual feature includes mouth movement of the avatar, the mouth movement corresponding to user speech.

At block 1018, in some embodiments, it is determined (e.g., by non-speech sound module 708), based on the second data stream, a third set of data representing facial movement corresponding to non-speech sound.

At block 1020, in some embodiments, it is determined (e.g., by emotion module 710), based on the second data stream, a fourth set of data representing an emotional state of the user.

At block 1022, the avatar is rendered using the first set of data (e.g., using rendering module 712). In some embodiments, rendering the avatar using the first set of data includes rendering the avatar using the second set of data, as shown in block 1024. In some embodiments, rendering the avatar using the first set of data includes rendering the avatar using the third set of data, as shown in block 1026. In some embodiments, rendering the avatar using the first set of data includes rendering the avatar using the fourth set of data, as shown in block 1028. In some embodiments, rendering the avatar using the first set of data includes synchronizing displayed mouth movement of the avatar with user speech included in the second data stream, as shown in block 1030.

In some embodiments, rendering the avatar using the first set of data includes displaying, on a display of the electronic device, the rendered avatar, as shown in block 1032. In some embodiments, rendering the avatar using the first set of data includes causing the external electronic device to display the rendered avatar, as shown in block 1034.

In some embodiments, one or more of blocks 1010-1034 are performed during the communication session with the external electronic device and while a camera corresponding to the communication session is disabled. In some embodiments, one or more of blocks 1010-1034 are performed while each camera corresponding to the communication session is disabled. In some embodiments, the electronic device includes one or more cameras of a predetermined type. In some embodiments, one or more of blocks 1010-1034 are performed while each of the one or more cameras of the predetermined type are disabled.

In some embodiments, the camera corresponding to the communication session is configured to transmit image and/or video data to one or more participants of the communication session. In some embodiments, the camera corresponding to the communication session is accessible by an application configured to provide the communication session.

In some embodiments, during the communication session: a user interface of a third application configured to provide the communication session is displayed and the electronic device transmits video data to the external electronic device, the video data representing the rendered avatar.

In some embodiments, one or more settings of the electronic device (e.g., stored in settings module 716) enable the user to prohibit an application installed on the electronic device from accessing any camera associated with the electronic device and authorize the application installed on the electronic device to access a rendering of the avatar.

The details of process 1000 described above (FIGS. 10A-10B) are also applicable in an analogous manner to process 1100 described below with respect to FIGS. 11A-11C. For example, process 1100 optionally includes one or more of the characteristics of the various steps described with reference to process 1000 (and vice-versa). For example, one or more steps of process 1100 can be performed in accordance with receiving the input corresponding to a request to render, without using a camera, and during a communication session with an external electronic device, an avatar associated with the user (block 1002) and/or in accordance with a determination that the electronic device is coupled to an external accessory device (block 1006). As another example, one or more steps of process 1100 can be performed during the communication session with the external electronic device and while a camera (or each camera) corresponding to the communication session is disabled. As another example, one or more steps of process 1000 can be performed in accordance with a determination that the user is speaking (as described with respect to block 1120 below). For brevity, these details are not repeated below.

Figure 11A:
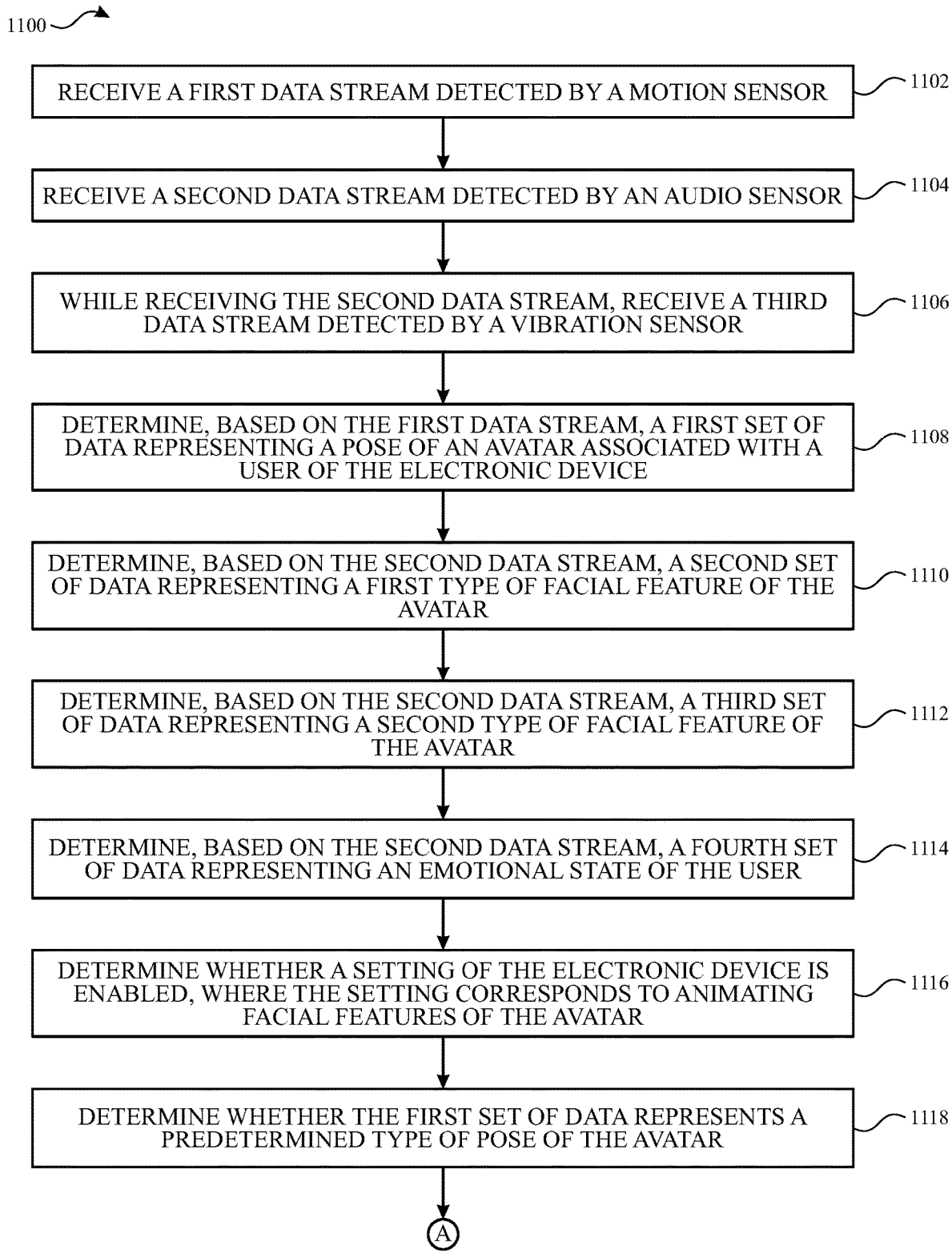
FIGS. 11A-11C is a flow diagram illustrating a process for avatar animation.
Figure 11B:
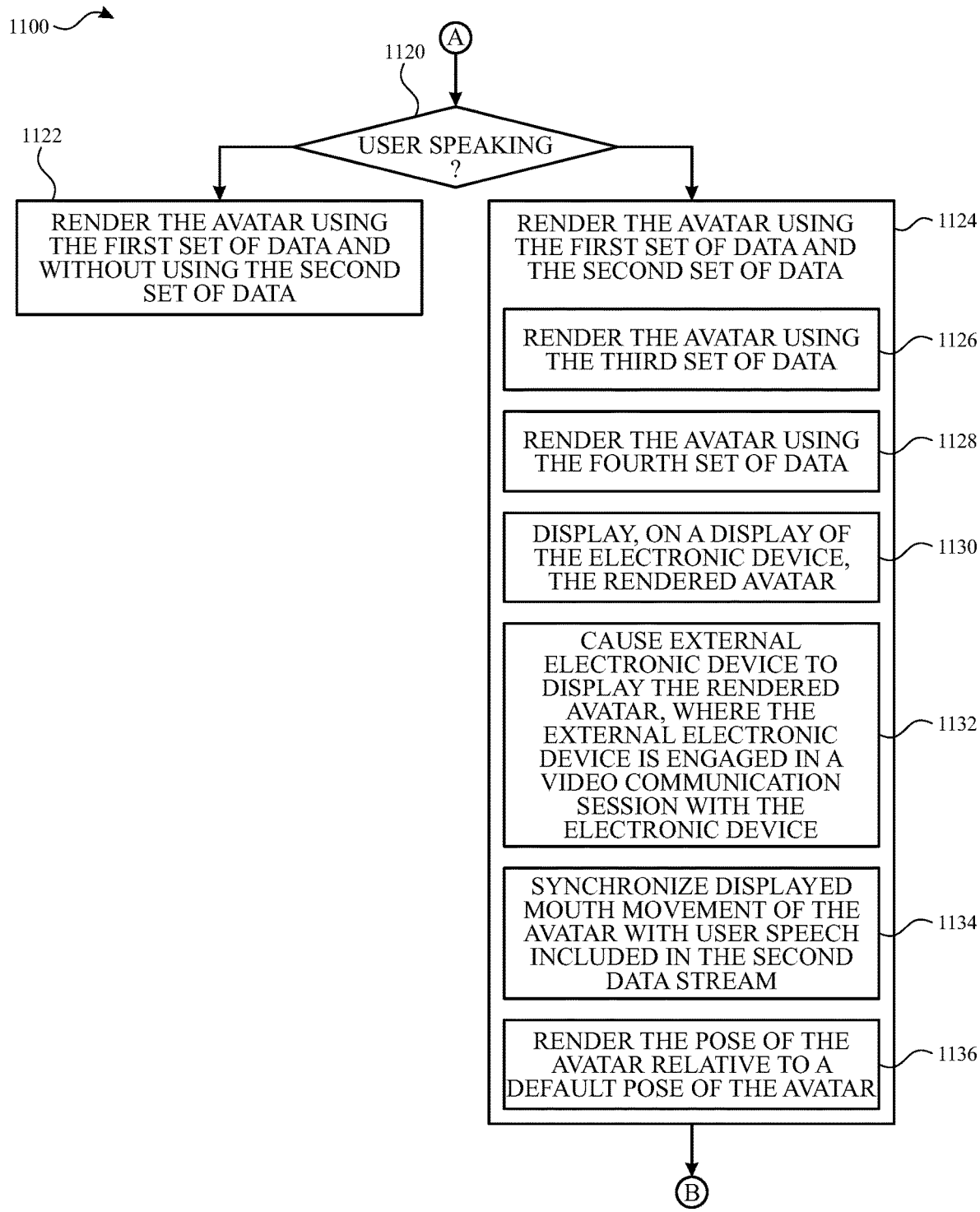
Figure 11C:
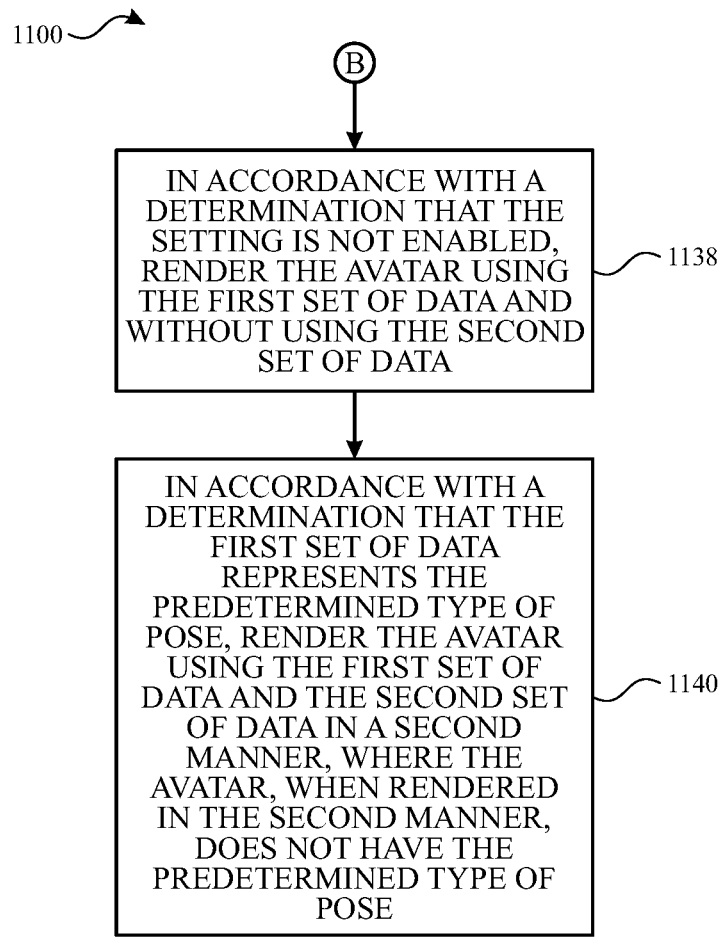

FIGS. 11A-11C is a flow diagram illustrating process 1100 for avatar animation. Process 1100 is performed at an electronic device (e.g., device 100, 300, 500, 604) with one or more processors and memory. Some operations in process 1100 are, optionally, combined, the orders of some operations are, optionally, changed, and some operations are, optionally, omitted.

At block 1102, a first data stream detected by a motion sensor (e.g., motion sensor(s) 612) is received (e.g., by visual feature module 702).

At block 1104, a second data stream detected by an audio sensor (e.g., audio sensor(s) 608) is received (e.g., by visual feature module 702). In some embodiments, the motion sensor includes a gyroscope and the audio sensor includes a microphone. In some embodiments, the electronic device (e.g., device 604) does not include a camera.

At block 1106, in some embodiments, while receiving the second data stream, a third data stream detected by a vibration sensor (e.g., vibration sensor(s) 610) is received (e.g., by visual feature module 702 and/or by speech detection module 714). In some embodiments, the vibration sensor includes a bone conduction microphone. In some embodiments, the electronic device includes the motion sensor, the audio sensor, and the vibration sensor. In some embodiments, an external electronic device (e.g., accessory device 602) includes the motion sensor, the audio sensor, and the vibration sensor and the first data stream, the second data stream, and the third data stream are each received from the external electronic device. In some embodiments, the external electronic device includes a headset.

At block 1108, it is determined (e.g., by pose module 704), based on the first data stream, a first set of data representing a pose of an avatar (e.g., avatar 800) associated with a user (e.g., user 802) of the electronic device.

At block 1110, it is determined (e.g., by mouth movement module 706), based on the second data stream, a second set of data representing a first type of facial feature of the avatar. In some embodiments, the first type of facial feature includes mouth movement of the avatar, the mouth movement corresponding to user speech.

At block 1112, in some embodiments, it is determined (e.g., by non-speech sound module 708) based on the second data stream, a third set of data representing a second type of facial feature of the avatar. In some embodiments, the second type of facial feature includes facial movement corresponding to non-speech sound.

At block 1114, in some embodiments, it is determined (e.g., by emotion module 710), based on the second data stream, a fourth set of data representing an emotional state of the user.

At block 1116, in some embodiments, it is determined (e.g., by settings module 716) whether a setting of the electronic device is enabled, where the setting corresponds to animating facial features of the avatar.

At block 1118, in some embodiments, it is determined (e.g., by rendering module 712) whether the first set of data represents a predetermined type of pose of the avatar.

At block 1120, in some embodiments, it is determined (e.g., by speech detection module 714), based on the third data stream, whether the user is speaking. At block 1122, in some embodiments, in accordance with a determination that the user is not speaking, the avatar is rendered (e.g., using rendering module 712) using the first set of data and without using the second set of data, the third set of data, and/or the fourth set of data.

At block 1124, the avatar is rendered (e.g., using rendering module 712) using the first set of data and the second set of data. In some embodiments, rendering the avatar using the first set of data and the second set of data is performed in accordance with a determination that the user is speaking.

In some embodiments, rendering the avatar using the first set of data and the second set of data includes rendering the avatar using the third set of data, as shown in block 1126. In some embodiments, rendering the avatar using the first set of data and the second set of data includes rendering the avatar using the fourth set of data, as shown in block 1128.

In some embodiments, rendering the avatar using the first set of data and the second set of data includes displaying, on a display of the electronic device, the rendered avatar, as shown in block 1130. In some embodiments, rendering the avatar using the first set of data and the second set of data includes causing a second external electronic device to display the rendered avatar, where the second external electronic device is engaged in a video communication session with the electronic device, as shown in block 1132.

In some embodiments, rendering the avatar using the first set of data and the second set of data includes synchronizing displayed mouth movement of the avatar with user speech included in the second data stream, as shown in block 1134. In some embodiments, rendering the avatar using the first set of data and the second set of data includes rendering the pose of the avatar relative to a default pose of the avatar, as shown in block 1136.

In some embodiments, rendering the avatar using the first set of data and the second set of data is performed in accordance with a determination that the setting corresponding to animating facial features of the avatar is enabled. In some embodiments, rendering the avatar using the first set of data and the second set of data includes rendering the avatar in a first manner (e.g., unmodified manner) in accordance with a determination that the first set of data does not represent the predetermined type of pose.

In some embodiments, one or more of the first set of data, the second set of data, the third set of data, and the fourth set of data are determined (e.g., at blocks 1108-1114) without processing data from a camera of the electronic device and/or without processing data from any camera. In some embodiments, the avatar is rendered (e.g., at blocks 1122-1140) without processing data from any cameras.

At block 1138, in some embodiments, in accordance with a determination that the setting corresponding to animating facial features of the avatar is not enabled, the avatar is rendered (e.g., using rendering module 712) using the first set of data and without using the second set of data, the third set of data, and/or the fourth set of data.

At block 1140, in some embodiments, in accordance with a determination that the first set of data represents the predetermined type of pose, the avatar is rendered (e.g., using rendering module 712) using the first set of data and the second set of data in a second manner (e.g., a modified manner), where, the avatar, when rendered in the second manner, does not have the predetermined type of pose.

The steps described above with reference to FIGS. 10A-10B and FIGS. 11A-11C are optionally implemented by components depicted in FIGS. 6 and 7. For example, the steps of processes 1000 and 1100 may be implemented by system 600, e.g., using animation module 614.

In accordance with some implementations, a computer-readable storage medium (e.g., a non-transitory computer readable storage medium) is provided, the computer-readable storage medium storing one or more programs for execution by one or more processors of an electronic device, the one or more programs including instructions for performing any of the methods or processes described herein.

In accordance with some implementations, an electronic device (e.g., a portable electronic device) is provided that comprises means for performing any of the methods or processes described herein.

In accordance with some implementations, an electronic device (e.g., a portable electronic device) is provided that comprises a processing unit configured to perform any of the methods or processes described herein.

In accordance with some implementations, an electronic device (e.g., a portable electronic device) is provided that comprises one or more processors and memory storing one or more programs for execution by the one or more processors, the one or more programs including instructions for performing any of the methods or processes described herein.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

As described above, one aspect of the present technology is the gathering and use of data available from various sources to render (e.g., animate) an avatar associated with a user. The present disclosure contemplates that in some instances, this gathered data may include personal information data that uniquely identifies or can be used to contact or locate a specific person. Such personal information data can include demographic data, location-based data, telephone numbers, email addresses, twitter IDs, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to render an avatar associated with a user during the communication session. Accordingly, use of such personal information data enables users to have a live displayed presence during communication sessions without activating a camera. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of rendering an avatar, the present technology can be configured to allow users to select to "opt in" or "opt out" of participation in the collection of personal information data during registration for services or anytime thereafter. In another example, users can select not to allow collection of data used to render the avatar. In yet another example, users can select to limit the length of time for which such data can be collected and/or prohibit certain applications from collecting such data to render the avatar. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, a static version of the avatar may be displayed based on non-personal information data or a bare minimum amount of personal information, such as the content being requested by the device associated with a user, other non-personal information available to the electronic device, or publicly available information.

What is claimed is:

1. A non-transitory computer-readable storage medium storing one or more programs, the one or more programs comprising instructions, which when executed by one or more processors of an electronic device, cause the electronic device to:
   receive, from a user, an input corresponding to a request to render, without using camera data, and during a communication session with an external electronic device, an avatar associated with the user; and
   in accordance with receiving the input:
      in accordance with a determination that the electronic device is coupled to an external accessory device:
         during the communication session with the external electronic device, and while a camera corresponding to the communication session is disabled:
            receive, from the external accessory device separate from the electronic device, a first data stream detected by a first type of sensor of the external accessory device, wherein the first type of sensor includes a vibration sensor for detecting bone conduction data;
            determine, based on the first data stream detected by the first type of sensor, a first set of data representing a first type of visual feature of the avatar; and
            render the avatar using the first set of data.

2. The non-transitory computer-readable storage medium of claim 1, wherein the external accessory device does not include a camera.

3. The non-transitory computer-readable storage medium of claim 1, wherein the external accessory device includes a headset.

4. The non-transitory computer-readable storage medium of claim 1, wherein the communication session corresponds to at least one of:
   a textual communication session;
   an audio communication session;
   a video communication session; and
   a virtual or mixed reality communication session.

5. The non-transitory computer-readable storage medium of claim 1, wherein the camera corresponding to the communication session is configured to transmit image data to one or more participants of the communication session.

6. The non-transitory computer-readable storage medium of claim 1, wherein:
   the input corresponds to a selection of an affordance displayed in a user interface of a second application configured to provide the communication session.

7. The non-transitory computer-readable storage medium of claim 6, wherein the one or more programs further comprise instructions, which when executed by the one or more processors, cause the electronic device to:
   in response to receiving the input corresponding to the selection of the affordance, disable a camera accessible by the second application.

8. The non-transitory computer-readable storage medium of claim 1, wherein the one or more programs further comprise instructions, which when executed by the one or more processors, cause the electronic device to:
   in accordance with receiving the input:
      in accordance with a determination that the electronic device is coupled to the external accessory device:
         during the communication session with the external electronic device, and while the camera corresponding to the communication session is disabled:
            receive, from the external accessory device, a second data stream detected by a second type of sensor of the external accessory device; and
            determine, based on the second data stream, a second set of data representing a second type of visual feature of the avatar; and
   wherein rendering the avatar using the first set of data includes rendering the avatar using the second set of data.

9. The non-transitory computer-readable storage medium of claim 8, wherein the second type of sensor includes an audio sensor and the second type of visual feature includes mouth movement of the avatar, the mouth movement corresponding to user speech.

10. The non-transitory computer-readable storage medium of claim 8, wherein the one or more programs further comprise instructions, which when executed by the one or more processors, cause the electronic device to:
determine, based on the second data stream, a third set of data representing facial movement corresponding to non-speech sound, wherein rendering the avatar using the first set of data includes rendering the avatar using the third set of data.

11. The non-transitory computer-readable storage medium of claim 8, wherein the one or more programs further comprise instructions, which when executed by the one or more processors, cause the electronic device to:
determine, based on the second data stream, a fourth set of data representing an emotional state of the user, wherein rendering the avatar using the first set of data includes rendering the avatar using the fourth set of data.

12. The non-transitory computer-readable storage medium of claim 8, wherein rendering the avatar using the first set of data includes:
synchronizing displayed mouth movement of the avatar with user speech included in the second data stream.

13. The non-transitory computer-readable storage medium of claim 1, wherein the first type of visual feature of the avatar includes facial movement of the avatar, the facial movement corresponding to a predetermined non-speech sound.

14. The non-transitory computer-readable storage medium of claim 1, wherein the first type of visual feature of the avatar includes an emotional state of the avatar, the emotional state corresponding to the a visual feature of the user.

15. The non-transitory computer-readable storage medium of claim 1, wherein the one or more programs further comprise instructions, which when executed by the one or more processors, cause the electronic device to:
determine, based on the first data stream detected by the first type of sensor, whether the user is speaking; and
in accordance with a determination that the user is not speaking, forgo rendering the avatar using the first set of data.

16. An electronic device, comprising:
one or more processors;
a memory; and
one or more programs, wherein the one or more programs are stored in the memory and configured to be executed by the one or more processors, the one or more programs including instructions for:
receiving, from a user, an input corresponding to a request to render, without using camera data, and during a communication session with an external electronic device, an avatar associated with the user; and
in accordance with receiving the input:
in accordance with a determination that the electronic device is coupled to an external accessory device:
during the communication session with the external electronic device, and while a camera corresponding to the communication session is disabled:
receiving, from the external accessory device separate from the electronic device, a first data stream detected by a first type of sensor of the external accessory device, wherein the first type of sensor includes a vibration sensor for detecting bone conduction data;
determining, based on the first data stream detected by the first type of sensor, a first set of data representing a first type of visual feature of the avatar; and
rendering the avatar using the first set of data.

17. The electronic device of claim 16, wherein the external accessory device does not include a camera.

18. The electronic device of claim 16, wherein the external accessory device includes a headset.

19. The electronic device of claim 16, wherein the communication session corresponds to at least one of:
a textual communication session;
an audio communication session;
a video communication session; and
a virtual or mixed reality communication session.

20. The electronic device of claim 16, wherein the camera corresponding to the communication session is configured to transmit image data to one or more participants of the communication session.

21. The electronic device of claim 16, wherein:
the input corresponds to a selection of an affordance displayed in a user interface of a second application configured to provide the communication session.

22. The electronic device of claim 21, wherein the one or more programs further include instructions for:
in response to receiving the input corresponding to the selection of the affordance, disabling a camera accessible by the second application.

23. The electronic device of claim 16, wherein the one or more programs further include instructions for:
in accordance with receiving the input:
in accordance with a determination that the electronic device is coupled to the external accessory device:
during the communication session with the external electronic device, and while the camera corresponding to the communication session is disabled:
receiving, from the external accessory device, a second data stream detected by a second type of sensor of the external accessory device; and
determining, based on the second data stream, a second set of data representing a second type of visual feature of the avatar; and
wherein rendering the avatar using the first set of data includes rendering the avatar using the second set of data.

24. The electronic device of claim 23, wherein the second type of sensor includes an audio sensor and the second type of visual feature includes mouth movement of the avatar, the mouth movement corresponding to user speech.

25. The non electronic device of claim 23, wherein the one or more programs further include instructions for:
determining, based on the second data stream, a third set of data representing facial movement corresponding to non-speech sound, wherein rendering the avatar using the first set of data includes rendering the avatar using the third set of data.

26. The electronic device of claim 23, wherein the one or more programs further include instructions for:
determining, based on the second data stream, a fourth set of data representing an emotional state of the user, wherein rendering the avatar using the first set of data includes rendering the avatar using the fourth set of data.

27. The electronic device of claim 23, wherein rendering the avatar using the first set of data includes:
synchronizing displayed mouth movement of the avatar with user speech included in the second data stream.

28. The electronic device of claim 16, wherein the first type of visual feature of the avatar includes facial movement of the avatar, the facial movement corresponding to a predetermined non-speech sound.

29. The electronic device of claim 16, wherein the first type of visual feature of the avatar includes an emotional state of the avatar, the emotional state corresponding to the a visual feature of the user.

30. The electronic device of claim 16, wherein the one or more programs further include instructions for:
determining, based on the first data stream detected by the first type of sensor, whether the user is speaking; and
in accordance with a determination that the user is not speaking, forging rendering the avatar using the first set of data.

31. A method, comprising:
at an electronic device with one or more processors and memory:
receiving, from a user, an input corresponding to a request to render, without using camera data, and during a communication session with an external electronic device, an avatar associated with the user; and
in accordance with receiving the input:
in accordance with a determination that the electronic device is coupled to an external accessory device:
during the communication session with the external electronic device, and while a camera corresponding to the communication session is disabled:
receiving, from the external accessory device separate from the electronic device, a first data stream detected by a first type of sensor of the external accessory device, wherein the first type of sensor includes a vibration sensor for detecting bone conduction data;
determining, based on the first data stream detected by the first type of sensor, a first set of data representing a first type of visual feature of the avatar; and
rendering the avatar using the first set of data.

32. The method of claim 31, wherein the external accessory device does not include a camera.

33. The method of claim 31, wherein the external accessory device includes a headset.

34. The method of claim 31, wherein the communication session corresponds to at least one of:
a textual communication session;
an audio communication session;
a video communication session; and
a virtual or mixed reality communication session.

35. The method of claim 31, wherein the camera corresponding to the communication session is configured to transmit image data to one or more participants of the communication session.

36. The method of claim 31, wherein:
the input corresponds to a selection of an affordance displayed in a user interface of a second application configured to provide the communication session.

37. The method of claim 36, further comprising:
in response to receiving the input corresponding to the selection of the affordance, disabling a camera accessible by the second application.

38. The method of claim 31, further comprising:
in accordance with receiving the input:
in accordance with a determination that the electronic device is coupled to the external accessory device:
during the communication session with the external electronic device, and while the camera corresponding to the communication session is disabled:
receiving, from the external accessory device, a second data stream detected by a second type of sensor of the external accessory device; and
determining, based on the second data stream, a second set of data representing a second type of visual feature of the avatar; and
wherein rendering the avatar using the first set of data includes rendering the avatar using the second set of data.

39. The method of claim 38, wherein the second type of sensor includes an audio sensor and the second type of visual feature includes mouth movement of the avatar, the mouth movement corresponding to user speech.

40. The method of claim 38, further comprising:
determining, based on the second data stream, a third set of data representing facial movement corresponding to non-speech sound, wherein rendering the avatar using the first set of data includes rendering the avatar using the third set of data.

41. The method of claim 38, further comprising:
determining, based on the second data stream, a fourth set of data representing an emotional state of the user, wherein rendering the avatar using the first set of data includes rendering the avatar using the fourth set of data.

42. The method of claim 38, wherein rendering the avatar using the first set of data includes:
synchronizing displayed mouth movement of the avatar with user speech included in the second data stream.

43. The method of claim 31, wherein the first type of visual feature of the avatar includes facial movement of the avatar, the facial movement corresponding to a predetermined non-speech sound.

44. The method of claim 31, wherein the first type of visual feature of the avatar includes an emotional state of the avatar, the emotional state corresponding to the a visual feature of the user.

45. The method of claim 31, further comprising:
determining, based on the first data stream detected by the first type of sensor, whether the user is speaking; and
in accordance with a determination that the user is not speaking, forgoing rendering the avatar using the first set of data.

* * * * *

UNITED STATES PATENT AND TRADEMARK OFFICE
CERTIFICATE OF CORRECTION

PATENT NO. : 12,267,623 B2
APPLICATION NO. : 17/751405
DATED : April 1, 2025
INVENTOR(S) : Justin G. Binder et al.

Page 1 of 1

It is certified that error appears in the above-identified patent and that said Letters Patent is hereby corrected as shown below:

In the Claims

In Column 51, Line 36, Claim 14, delete "the a" and insert -- a --, therefor.

In Column 52, Line 54, Claim 25, delete "non electronic" and insert -- electronic --, therefor.

In Column 53, Lines 11-12, Claim 29, delete "the a" and insert -- a --, therefor.

In Column 54, Line 52, Claim 44, delete "the a" and insert -- a --, therefor.

Signed and Sealed this
Twenty-seventh Day of May, 2025

Coke Morgan Stewart
*Acting Director of the United States Patent and Trademark Office*